US009250316B2

(12) United States Patent
Chen

(10) Patent No.: US 9,250,316 B2
(45) Date of Patent: *Feb. 2, 2016

(54) METHODS, SYSTEMS, AND APPARATUS TO SYNCHRONIZE ACTIONS OF AUDIO SOURCE MONITORS

(71) Applicant: The Nielsen Company (US), LLC, New York, NY (US)

(72) Inventor: Jie Chen, Land O Lakes, FL (US)

(73) Assignee: The Nielsen Company (US), LLC, New York, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/136,371

(22) Filed: Dec. 20, 2013

(65) Prior Publication Data

US 2014/0109122 A1    Apr. 17, 2014

Related U.S. Application Data

(63) Continuation of application No. 12/968,677, filed on Dec. 15, 2010, now Pat. No. 8,855,101.

(60) Provisional application No. 61/311,893, filed on Mar. 9, 2010.

(51) Int. Cl.
*H04J 3/06*   (2006.01)
*G01S 11/14*  (2006.01)
(Continued)

(52) U.S. Cl.
CPC . *G01S 11/14* (2013.01); *G01S 5/18* (2013.01); *H04N 21/44218* (2013.01)

(58) Field of Classification Search
USPC .................. 370/252, 328, 338, 350, 401, 503
See application file for complete search history.

(56) References Cited

U.S. PATENT DOCUMENTS 2,903,508 A    9/1959    Hathaway
3,056,135 A    9/1962    Currey et al.
(Continued)

FOREIGN PATENT DOCUMENTS

EP    0946012    9/1999
EP    1133090    9/2001
(Continued)

OTHER PUBLICATIONS

International Searching Authority, "International Report on Patentability," issued in connection with International Patent Application No. PCT/US2005/034743, mailed Mar. 27, 2007 (8 pages).
(Continued)

*Primary Examiner* — Ricky Ngo
*Assistant Examiner* — Christine Ng
(74) *Attorney, Agent, or Firm* — Hanley, Flight & Zimmerman, LLC

(57) ABSTRACT

Systems, methods, articles of manufacture and apparatus are disclosed to align actions of audio source monitors. An example method disclosed herein includes invoking an audience monitor to transmit a radio frequency (RF) initialization packet to a base unit, receiving an indication that the base unit has received the RF initialization packet at a first time, and invoking the base unit to transmit an RF acknowledgement packet to the audience monitor. The example method also includes receiving an indication that the RF acknowledgement packet is received by the audience monitor and waiting for an end to a delay period having a first value, identifying whether the audience monitor has finished processing the RF acknowledgement packet when the delay period ends at a second time, and incrementing the delay period to a second value when the audience monitor is still processing the RF acknowledgement packet and the delay period has ended.

20 Claims, 21 Drawing Sheets

(51) Int. Cl.
*G01S 5/18* (2006.01)
*H04N 21/442* (2011.01)

(56) References Cited

U.S. PATENT DOCUMENTS

| | | | |
|---|---|---|---|
| 4,107,734 A | 8/1978 | Percy et al. | |
| 4,382,291 A | 5/1983 | Nakauchi | |
| 4,574,304 A | 3/1986 | Watanabe et al. | |
| 4,605,958 A | 8/1986 | Machnik et al. | |
| 4,626,904 A | 12/1986 | Lurie | |
| 4,644,509 A | 2/1987 | Kiewit et al. | |
| 4,695,879 A | 9/1987 | Weinblatt | |
| 4,718,106 A | 1/1988 | Weinblatt | |
| 4,728,930 A * | 3/1988 | Grote et al. | 341/101 |
| 4,740,792 A | 4/1988 | Sagey et al. | |
| 4,769,697 A | 9/1988 | Gilley et al. | |
| 4,779,198 A | 10/1988 | Lurie | |
| 4,930,011 A | 5/1990 | Kiewit | |
| 4,955,000 A | 9/1990 | Nastrom | |
| 4,972,471 A | 11/1990 | Gross et al. | |
| 4,972,503 A | 11/1990 | Zurlinden | |
| 4,990,892 A | 2/1991 | Guest et al. | |
| 5,029,183 A | 7/1991 | Tymes | |
| 5,119,104 A | 6/1992 | Heller | |
| 5,146,231 A | 9/1992 | Ghaem et al. | |
| 5,226,090 A | 7/1993 | Kimura | |
| 5,226,177 A | 7/1993 | Nickerson | |
| 5,245,664 A | 9/1993 | Kinoshite et al. | |
| 5,280,498 A | 1/1994 | Tymes et al. | |
| 5,285,498 A | 2/1994 | Johnston | |
| 5,294,981 A | 3/1994 | Yazolino et al. | |
| 5,382,970 A | 1/1995 | Kiefl | |
| 5,387,993 A | 2/1995 | Heller et al. | |
| 5,404,377 A | 4/1995 | Moses | |
| 5,428,821 A | 6/1995 | Krisna et al. | |
| 5,442,343 A | 8/1995 | Cato et al. | |
| 5,457,807 A | 10/1995 | Weinblatt | |
| 5,473,631 A | 12/1995 | Moses | |
| 5,481,294 A | 1/1996 | Thomas et al. | |
| 5,483,276 A | 1/1996 | Brooks et al. | |
| 5,550,928 A | 8/1996 | Lu et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,629,739 A | 5/1997 | Dougherty | |
| 5,630,203 A | 5/1997 | Weinblatt | |
| 5,640,144 A | 6/1997 | Russo et al. | |
| 5,646,675 A | 7/1997 | Copriviza et al. | |
| 5,692,215 A | 11/1997 | Kutzik et al. | |
| 5,774,876 A | 6/1998 | Woolley et al. | |
| 5,787,334 A | 7/1998 | Fardeau et al. | |
| 5,793,409 A | 8/1998 | Tetsumura | |
| 5,805,983 A | 9/1998 | Naidu et al. | |
| 5,812,930 A | 9/1998 | Zavrel | |
| 5,815,114 A | 9/1998 | Speasl et al. | |
| 5,839,050 A | 11/1998 | Baehr et al. | |
| 5,872,588 A | 2/1999 | Aras et al. | |
| 5,877,906 A | 3/1999 | Nagasawa et al. | |
| 5,884,278 A | 3/1999 | Powell | |
| 5,893,093 A | 4/1999 | Wills | |
| 5,896,554 A * | 4/1999 | Itoh | 455/2.01 |
| 5,982,808 A | 11/1999 | Otto | |
| 6,002,918 A | 12/1999 | Heiman et al. | |
| 6,014,102 A | 1/2000 | Mitzlaff et al. | |
| 6,035,177 A | 3/2000 | Moses et al. | |
| 6,091,956 A | 7/2000 | Hollenberg | |
| 6,098,048 A | 8/2000 | Dashefsky et al. | |
| 6,243,739 B1 | 6/2001 | Schwartz et al. | |
| 6,252,522 B1 | 6/2001 | Hampton et al. | |
| 6,272,176 B1 | 8/2001 | Srinivasan | |
| 6,317,854 B1 * | 11/2001 | Watanabe | 714/749 |
| 6,359,557 B2 | 3/2002 | Bilder | |
| 6,380,988 B1 | 4/2002 | Sung | |
| 6,396,413 B2 | 5/2002 | Hines et al. | |
| 6,421,445 B1 | 7/2002 | Jensen et al. | |
| 6,424,264 B1 | 7/2002 | Giraldin et al. | |
| 6,430,498 B1 | 8/2002 | Maruyama et al. | |
| 6,433,689 B1 | 8/2002 | Hovind et al. | |
| 6,467,089 B1 | 10/2002 | Aust et al. | |
| 6,470,264 B2 | 10/2002 | Bide | |
| 6,484,316 B1 | 11/2002 | Lindberg | |
| 6,487,719 B1 | 11/2002 | Itoh et al. | |
| 6,493,649 B1 | 12/2002 | Jones et al. | |
| 6,497,658 B2 | 12/2002 | Roizen et al. | |
| 6,563,423 B2 | 5/2003 | Smith | |
| 6,563,430 B1 | 5/2003 | Kemink et al. | |
| 6,577,238 B1 | 6/2003 | Whitesmith et al. | |
| 6,647,548 B1 | 11/2003 | Lu et al. | |
| 6,654,800 B1 | 11/2003 | Rieger, III | |
| 6,662,137 B2 | 12/2003 | Squibbs | |
| 6,731,942 B1 | 5/2004 | Nageli | |
| 6,748,317 B2 | 6/2004 | Maruyama et al. | |
| 6,766,524 B1 | 7/2004 | Matheny et al. | |
| 6,788,704 B1 * | 9/2004 | Lindsay | 370/465 |
| 6,842,877 B2 | 1/2005 | Robarts et al. | |
| 6,862,541 B2 | 3/2005 | Mizushima | |
| 6,882,837 B2 | 4/2005 | Fernandez et al. | |
| 6,888,457 B2 | 5/2005 | Wilkinson et al. | |
| 6,898,434 B2 | 5/2005 | Pradhan et al. | |
| 6,919,803 B2 | 7/2005 | Breed | |
| 6,928,280 B1 | 8/2005 | Xanthos et al. | |
| 6,928,367 B2 | 8/2005 | Gray et al. | |
| 6,934,508 B2 | 8/2005 | Ceresoli et al. | |
| 6,940,403 B2 | 9/2005 | Kail, IV | |
| 6,958,710 B2 | 10/2005 | Zhang et al. | |
| 6,967,674 B1 | 11/2005 | Lausch | |
| 6,970,131 B2 | 11/2005 | Percy et al. | |
| 7,038,619 B2 | 5/2006 | Percy et al. | |
| 7,039,098 B2 | 5/2006 | Younis | |
| 7,046,162 B2 | 5/2006 | Dunstan | |
| 7,047,548 B2 | 5/2006 | Bates et al. | |
| 7,076,441 B2 | 7/2006 | Hind et al. | |
| 7,080,061 B2 | 7/2006 | Kabala | |
| 7,099,676 B2 | 8/2006 | Law et al. | |
| 7,100,181 B2 | 8/2006 | Srinivasan et al. | |
| 7,102,615 B2 | 9/2006 | Marks | |
| 7,126,454 B2 | 10/2006 | Bulmer | |
| 7,148,803 B2 | 12/2006 | Bandy et al. | |
| 7,155,159 B1 | 12/2006 | Weinblatt et al. | |
| 7,171,331 B2 | 1/2007 | Vock et al. | |
| 7,222,071 B2 | 5/2007 | Neuhauser et al. | |
| 7,242,910 B2 | 7/2007 | Peterson, III et al. | |
| 7,295,108 B2 | 11/2007 | Corrado et al. | |
| 7,343,615 B2 | 3/2008 | Nelson et al. | |
| 7,354,400 B2 | 4/2008 | Asafusa et al. | |
| 7,359,408 B2 | 4/2008 | Kim | |
| 7,363,028 B2 | 4/2008 | de Clerq et al. | |
| 7,460,827 B2 | 12/2008 | Schuster et al. | |
| 7,463,143 B2 | 12/2008 | Forr et al. | |
| 7,471,987 B2 | 12/2008 | Crystal et al. | |
| 7,483,975 B2 | 1/2009 | Kolessar et al. | |
| 7,555,766 B2 | 6/2009 | Kondo et al. | |
| 7,627,139 B2 | 12/2009 | Marks et al. | |
| 7,668,188 B2 * | 2/2010 | Chang et al. | 370/415 |
| 7,739,705 B2 | 6/2010 | Lee et al. | |
| 7,760,248 B2 | 7/2010 | Marks et al. | |
| 7,792,660 B2 | 9/2010 | Iyengar | |
| 7,796,516 B2 * | 9/2010 | Todd et al. | 370/232 |
| 8,189,748 B2 * | 5/2012 | Susama et al. | 379/88.17 |
| 8,239,887 B2 | 8/2012 | Gilboa et al. | |
| 8,245,249 B2 | 8/2012 | Lee | |
| 8,260,927 B2 * | 9/2012 | Coronado et al. | 709/226 |
| 8,266,644 B2 | 9/2012 | Randolph et al. | |
| 8,295,217 B2 * | 10/2012 | Kone et al. | 370/311 |
| 8,345,620 B2 * | 1/2013 | Chen et al. | 370/330 |
| 8,738,763 B2 | 5/2014 | Crystal et al. | |
| 8,824,242 B2 | 9/2014 | Lee | |
| 8,855,101 B2 * | 10/2014 | Chen | 370/350 |
| 2002/0031120 A1 | 3/2002 | Rakib | |
| 2002/0059218 A1 | 5/2002 | August et al. | |
| 2002/0068556 A1 | 6/2002 | Brown | |
| 2002/0085627 A1 | 7/2002 | Younis | |
| 2002/0097885 A1 | 7/2002 | Birchfield et al. | |
| 2002/0144259 A1 | 10/2002 | Gutta et al. | |

(56) References Cited

U.S. PATENT DOCUMENTS

| | | |
|---|---|---|
| 2002/0150387 A1 | 10/2002 | Kunii et al. |
| 2002/0174425 A1 | 11/2002 | Markel et al. |
| 2002/0198762 A1 | 12/2002 | Donato |
| 2003/0033600 A1 | 2/2003 | Cliff et al. |
| 2003/0046685 A1 | 3/2003 | Srinivasan et al. |
| 2003/0070182 A1 | 4/2003 | Pierre et al. |
| 2003/0093784 A1 | 5/2003 | Dimitrova et al. |
| 2003/0097302 A1 | 5/2003 | Overhultz et al. |
| 2003/0122708 A1 | 7/2003 | Percy et al. |
| 2003/0126593 A1 | 7/2003 | Mault |
| 2003/0136827 A1 | 7/2003 | Kaneko et al. |
| 2003/0146871 A1 | 8/2003 | Karr et al. |
| 2003/0171833 A1 | 9/2003 | Crystal et al. |
| 2003/0177488 A1 | 9/2003 | Smith et al. |
| 2003/0194004 A1 | 10/2003 | Srinivasan |
| 2003/0208754 A1 | 11/2003 | Sridhar et al. |
| 2003/0222819 A1 | 12/2003 | Karr et al. |
| 2003/0222820 A1 | 12/2003 | Karr et al. |
| 2004/0003073 A1 | 1/2004 | Krzyzanowski et al. |
| 2004/0019463 A1 | 1/2004 | Kolessar et al. |
| 2004/0019675 A1 | 1/2004 | Hebeler, Jr. et al. |
| 2004/0025174 A1 | 2/2004 | Cerrato |
| 2004/0027271 A1 | 2/2004 | Schuster et al. |
| 2004/0037436 A1 | 2/2004 | Rui |
| 2004/0095276 A1 | 5/2004 | Krumm et al. |
| 2004/0122679 A1 | 6/2004 | Neuhauser et al. |
| 2004/0190730 A1 | 9/2004 | Rui et al. |
| 2004/0198386 A1 | 10/2004 | Dupray |
| 2004/0218701 A1 | 11/2004 | Singh et al. |
| 2004/0266457 A1 | 12/2004 | Dupray |
| 2005/0035857 A1 | 2/2005 | Zhang et al. |
| 2005/0035858 A1 | 2/2005 | Liu |
| 2005/0125820 A1 | 6/2005 | Nelson et al. |
| 2005/0141345 A1 | 6/2005 | Holm et al. |
| 2005/0144632 A1 | 6/2005 | Mears et al. |
| 2005/0172311 A1 | 8/2005 | Hjelt et al. |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0204379 A1 | 9/2005 | Yamamori |
| 2005/0207592 A1 | 9/2005 | Sporer et al. |
| 2005/0216509 A1 | 9/2005 | Kolessar et al. |
| 2005/0234774 A1 | 10/2005 | Dupree |
| 2005/0243784 A1 | 11/2005 | Fitzgerald et al. |
| 2005/0244011 A1 | 11/2005 | Kim |
| 2005/0264430 A1 | 12/2005 | Zhang et al. |
| 2005/0265562 A1 | 12/2005 | Rui |
| 2006/0053110 A1 | 3/2006 | McDonald et al. |
| 2006/0075421 A1 | 4/2006 | Roberts et al. |
| 2006/0168613 A1 | 7/2006 | Wood et al. |
| 2006/0190450 A1 | 8/2006 | Holm et al. |
| 2006/0202973 A1 | 9/2006 | Kobayashi et al. |
| 2007/0011040 A1 | 1/2007 | Wright et al. |
| 2007/0018708 A1* | 1/2007 | Yoo ............................ 327/261 |
| 2007/0159924 A1 | 7/2007 | Vook et al. |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0086533 A1 | 4/2008 | Neuhauser et al. |
| 2008/0091087 A1 | 4/2008 | Neuhauser et al. |
| 2008/0091451 A1 | 4/2008 | Crystal |
| 2008/0091762 A1 | 4/2008 | Neuhauser et al. |
| 2008/0101454 A1 | 5/2008 | Luff et al. |
| 2008/0109295 A1 | 5/2008 | McConochie et al. |
| 2008/0130906 A1 | 6/2008 | Goldstein et al. |
| 2008/0204273 A1 | 8/2008 | Crystal et al. |
| 2009/0037575 A1 | 2/2009 | Crystal et al. |
| 2009/0133058 A1 | 5/2009 | Kouritzin et al. |
| 2009/0169024 A1 | 7/2009 | Krug et al. |
| 2009/0180351 A1 | 7/2009 | Paffenholz et al. |
| 2009/0262137 A1 | 10/2009 | Walker et al. |
| 2009/0290064 A1* | 11/2009 | Matsumoto et al. .......... 348/515 |
| 2010/0111311 A1 | 5/2010 | Yamakawa et al. |
| 2010/0199296 A1 | 8/2010 | Lee et al. |
| 2010/0268540 A1 | 10/2010 | Arshi et al. |
| 2010/0268573 A1 | 10/2010 | Jain et al. |
| 2011/0019835 A1 | 1/2011 | Schmidt et al. |
| 2011/0091055 A1 | 4/2011 | Leblanc |
| 2011/0182148 A1 | 7/2011 | Radusch et al. |
| 2011/0222528 A1 | 9/2011 | Chen |
| 2012/0120218 A1 | 5/2012 | Flaks et al. |
| 2012/0124602 A1 | 5/2012 | Tan et al. |
| 2012/0148058 A1 | 6/2012 | Chen |
| 2012/0148067 A1 | 6/2012 | Petersen et al. |
| 2012/0169359 A1 | 7/2012 | Kim et al. |
| 2012/0219156 A1 | 8/2012 | Ramaswamy et al. |
| 2013/0034244 A1 | 2/2013 | Van Raalte et al. |
| 2013/0166050 A1 | 6/2013 | Duwenhorst |
| 2014/0126746 A1 | 5/2014 | Shin et al. |
| 2014/0347961 A1 | 11/2014 | Lee |

FOREIGN PATENT DOCUMENTS

| | | |
|---|---|---|
| EP | 1213860 | 6/2002 |
| GB | 2260246 | 7/1993 |
| GB | 2292506 | 2/1996 |
| JP | 2000224617 | 8/2000 |
| JP | 2000307530 | 11/2000 |
| JP | 2003061027 | 2/2003 |
| JP | 2003125102 | 4/2003 |
| JP | 2003279400 | 10/2003 |
| JP | 2005260719 | 9/2005 |
| JP | 2005322262 | 11/2005 |
| JP | 2006215774 | 8/2006 |
| JP | 2010257278 | 11/2010 |
| JP | 2012507904 | 3/2012 |
| JP | 2012095014 | 5/2012 |
| JP | 2012242214 | 12/2012 |
| KR | 20020000288 | 1/2002 |
| KR | 100911679 | 8/2009 |
| KR | 20100048330 | 5/2010 |
| KR | 20120067477 | 6/2012 |
| KR | 20120131826 | 12/2012 |
| WO | 8810540 | 12/1988 |
| WO | 9111062 | 7/1991 |
| WO | 9411989 | 5/1994 |
| WO | 9731440 | 8/1997 |
| WO | 9955057 | 10/1999 |
| WO | 0131816 | 5/2001 |
| WO | 02/073593 | 9/2002 |
| WO | 02097791 | 12/2002 |
| WO | 03/077455 | 9/2003 |
| WO | 03/087871 | 10/2003 |
| WO | 2004051303 | 6/2004 |
| WO | 2004051304 | 6/2004 |
| WO | 2006/037014 | 4/2006 |
| WO | 2006096177 | 9/2006 |
| WO | 2006121681 | 11/2006 |
| WO | 2010049809 | 5/2010 |

OTHER PUBLICATIONS

International Searching Authority, "International Search Report," issued in connection with International Patent Application No. PCT/US02/12333, mailed Jul. 4, 2003 (2 pages).

United States Patent and Trademark Office, "Notice of Allowance," issued in connection with U.S. Appl. No. 12/968,677, mailed Jun. 4, 2014 (5 pages).

United States Patent and Trademark Office, "Notice of Allowance," issued in connection with U.S. Appl. No. 12/968,677, mailed Oct. 17, 2013 (7 pages).

United States Patent and Trademark Office, "Non-Final Office Action," issued in connection with U.S. Appl. No. 12/968,677, mailed Feb. 5, 2013 (21 pages).

United States Patent and Trademark Office, "Final Office Action," issued in connection with U.S. Appl. No. 12/968,677, mailed Jun. 21, 2013 (23 pages).

(56) References Cited

OTHER PUBLICATIONS

United States Patent and Trademark Office, "Notice of Allowance," issued in connection with U.S. Appl. No. 13/043,025, mailed Apr. 25, 2014 (7 pages).
United States Patent and Trademark Office, "Supplemental Notice of Allowance," issued in connection with U.S. Appl. No. 13/043,025, mailed Jul. 28, 2014 (2 pages).
United States Patent and Trademark Office, "Notice of Allowance," issued in connection with U.S. Appl. No. 12/757,755, mailed Mar. 23, 2015 (9 pages).
Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).
Bernstein et al., "An Introduction to Map Matching for Personal Navigation Assistants," New Jersey TIDE Center, New Jersey Institute of Technology, Aug. 1996 (17 pages).
Kerschbaumer, Ken, "Who's Really Watching? How Cable's Digital Box Will Rock the Ratings World," Reed Business Information, a Division of Reed Elsevier, Inc., May 16, 2005 (4 pages).
McCarthy et al., "RF Free Ultrasonic Positioning," Department of Computer Science, University of Bristol, U.K., 2003 (7 pages).
McCarthy et al., "RF Free Ultrasonic Positioning (Presentation)," $7^{th}$ International Symposiom on Wearable Computers, Oct. 2003 (12 pages).
Gentile et al., "Robust Location using System Dynamics and Motion Constraints," National Institute of Standards and Technology, Wireless Communication Technologies Group, Jun. 24, 2004 (5 pages).
Cricket Project, "Cricket v2 User Manual," MIT Computer Science and Artificial Intelligence Lab, Cambridge, U.S.A., Jan. 2005 (57 pages).
Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).
"The Nibble Location System," [online]. UCLA, May 21, 2001 [retrieved on Nov. 2, 2004]. Retrieved from the Internet: <URL: http://mmsl.cs.ucla.edu/nibble/>. (13 pages).
"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).
"NIST Location System," [online] Wireless Communication Technologies Group, National Institute of Standards and Technology, Mar. 12, 2004 [retrieved in Nov. 1, 2004]. Retrieved from the Internet: <URL: www.antd.nist.gov>. (2 pages).
Ferguson, Michael. "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).
"FM Wireless Microphone Module Kits," [online]. Horizon Industries, 2004 [retrieved on Sep. 30, 2004]. Retrieved from the Internet: <URL: www.horizonindustries.com/fm.htm>. (1 page).
"Arkon Sound Feeder II FM Transmitter," [online]. Yahoo Shopping, 2002 [retrieved on Sep. 29, 2004]. Retrieved from the Internet: <URL: http://store.yahoo.com/semsons-inc/arsoundfeedii.html>. (2 pages).
"Dust Networks—SmartMesh," [online]. Dust Networks Inc., 2002 [retrieved on Sep. 29, 2004]. Retrieved from the Internet: <URL: www.dustnetworks.com>. (2 pages).
Kanellos, Michael. "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).
"UHF Radio Data Logging System—GenII Data Logger," [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).
"Eltek GenII Radio Data Logging System," [online]. Eltek Ltd., 2004 [retrieved on Sep. 29, 2004]. Retrieved from the Internet: <URL: www.elteckdataloggers.co.uk>. (4 pages).
"World's Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).
"American Technology Corporation—Retailer Ads—AM & FM Sounds," [online]. Woody Norris, May 4, 2004 [retrieved on Sep. 29, 2004]. Retrieved from the Internet: <URL: www.woodynorris.com>. (3 pages).
"X1 Button Radio—The World's Smallest Radio," [online]. Exxun, 2004 [retrieved on Sep. 29, 2004]. Retrieved from the Internet: <URL: www.exxun.com>. (2 pages).
"Discovery Spy Motion Tracking System," [online]. Discovery Communications Inc., 2004 [retrieved on Sep. 14, 2004]. Retrieved from the Internet: <URL: http://shopping.discovery.com/stores/servlet/ProductDisplay?catalogId=10000&storeId=10000&lanlan=-1&productId=53867&partnumber=689638>. (3 pages).
Schuman, Evan. "Smarter Smart Cart?" [online]. Storefront Backtalk, Feb. 16, 2005 [retrieved on Nov. 20, 2006]. Retrieved from the Internet: <URL: www.storefrontbacktalk.com>. (5 pages).
"Arbitron & Scarborough Unveil New Mall Shopper Audience Measurement," [online]. Streamline Media Inc., Jun. 22, 2007 [retrieved in 2007]. Retrieved from the Internet: <URL: www.radioink.com>. (2 pages).
"University Library Navigation Enabled by Ekahau," [online] Directions Magazine, Jun. 12, 2003 [Aug. 3, 2007]. Retrieved from the Internet: <URL: http://www/directionsmag.com/press.releases/index.php?duty=Show&id=7276&trv=1>. (3 pages).
Patent Cooperation Treaty, "Search Report," mailed Oct. 31, 2006, in corresponding PCT application No. PCT/US05/34743, 4 pages.
Patent Cooperation Treaty, "International Preliminary Report on Patentability," mailed Mar. 27, 2007, in corresponding PCT application No. PCT/US05/34743, 8 pages.
Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).
Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (pp. 7).
Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).
Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).
United States Patent and Trademark Office, "Non-Final Office Action," issued in connection with U.S. Appl. No. 13/043,025, on Jun. 25, 2013 (13 pages).
United States Patent and Trademark Office, "Final Office Action," issued in connection with U.S. Appl. No. 13/043,025, on Dec. 4, 2013 (12 pages).
United States Patent and Trademark Office, "Non-Final Office Action," issued in connection with U.S. Appl. No. 12/757,755, on Sep. 20, 2010 (10 pages).
United States Patent and Trademark Office, "Final Office Action," issued in connection with U.S. Appl. No. 12/757,755, on Mar. 28, 2011 (11 pages).
United States Patent and Trademark Office, "Notice of Allowance," issued in connection with U.S. Appl. No. 11/692,087, on Jan. 12, 2010 (8 pages).
Mexican institute of industrial propert, "Office Action," issued in connection with Mexican Patent Application No. MX/a/2007/003680, on Sep. 14, 2009 (5 pages).
European Patent Office, "Extended European Search Report," issued in connection with European Patent Application No. 05 798 935.2, on May 3, 2012 (7 pages).

(56) References Cited

OTHER PUBLICATIONS

Canadian Intellectual Property Office, "Notice of Allowance," issued in connection with Canadian Patent Application No. 2,581,982, on Jan. 14, 2013 (1 page).
Patent Cooperation Treaty, "International Preliminary Examination Report," issued in connection with International Patent Application No. PCT/US02/12333, on Oct. 20, 2005 (3 pages).
United States Patent and Trademark Office, "Non-Final Office Action," issued in connection with U.S. Appl. No. 11/037,277, on Apr. 20, 2007 (6 pages).
United States Patent and Trademark Office, "Notice of Allowance," issued in connection with U.S. Appl. No. 11/037,277, on Nov. 1, 2007 (6 pages).
United States Patent and Trademark Office, "Non-Final Office Action," issued in connection with U.S. Appl. No. 10/125,577, on Jul. 2, 2003 (7 pages).
United States Patent and Trademark Office, "Non-Final Office Action," issued in connection with U.S. Appl. No. 10/125,577, on Jan. 17, 2003 (7 pages).
United States Patent and Trademark Office, "Notice of Allowance," issued in connection with U.S. Appl. No. 10/125,577, on Apr. 1, 2004 (12 pages).
United States Patent and Trademark Office, "Final Office Action," issued in connection with U.S. Appl. No. 10/125,577, on Jan. 5, 2004 (10 pages).
Wagner, David P. Battelle. Report: Lexington Area Travel Data Collection Test; GPS for Personal Travel Surveys. Final Report for Office of Highway Information Management, Office of Technology Application, and Federal Highway Administration, Sep. 1997, (92 pages).
Bahl et al., "A Software System for Locating Mobile Users: Design, Evaluation, and Lessons", Technical Report MSRTR-2000-12 Microsoft Research, [retrieved from internet, http://research.microsoft.com/~bahl/Papers/Pdf/radar.pdf],Feb. 2000 (13 Pages).
United States Patent and Trademark Office, Office Action issued in connection with U.S. Appl. No. 11/692,087, dated Oct. 30, 2009, 38 pages.
United States Patent and Trademark Office, Office Action issued in connection with U.S. Appl. No. 11/692,087, dated May 13, 2009, 14 pages.
International Searching Authority, International Search Report and Written Opinion issued in connection with International Application PCT/US05/23478, mailed on Jan. 23, 2006, 9 pages.
International Searching Authority, International Search Report and Written Opinion issued in connection with International Application PCT/US05/34743, mailed Oct. 31, 2006, 12 pages.
International Searching Authority, International Preliminary Report on Patentability issued in connection with International Application PCT/US05/34743, mailed Apr. 5, 2007, 9 pages.
United States Patent and Trademark Office, "Non-Final Office Action," issued in connection with U.S. Appl. No. 14/455,968, mailed Jul. 15, 2015 (7 pages).

\* cited by examiner

770 ↘

| TIME UNIT 772 | CORRELATION VALUE 774 |
|---|---|
| 80 | 0.348802 |
| 81 | 0.349169 |
| 82 | 0.348064 |
| 83 | 0.349381 |
| 84 | 0.349336 |
| 85 | 0.349706 |
| 86 | 0.350163 |
| 87 | 0.349362 |
| 88 | 0.349776 |
| 89 | 0.349906 |
| 90 | 0.352142 |
| 91 | 0.351807 |
| 92 | 0.352578 |
| 93 | 0.352820 ← Local Maximum |
| 94 | 0.352296 |
| 95 | 0.350131 |
| 96 | 0.349034 |
| 97 | 0.349789 |
| 98 | 0.348669 |
| 99 | 0.348929 |
| 100 | 0.351478 |
| 101 | 0.350873 |
| 102 | 0.351794 |

| TIME UNIT (802) | CORRELATION VALUE (804) | |
|---|---|---|
| 80 | 0.348802 | |
| 81 | 0.349169 | |
| 82 | 0.348064 | |
| ... | ... | |
| 92 | 0.352578 | |
| 93 | 0.352820 | ← Local Maximum |
| 94 | 0.352296 | |
| ... | ... | |
| 165 | 0.365142 | |
| 166 | 0.365924 | |
| 167 | 0.367321 | |
| 168 | 0.368839 | ← Local Maximum |
| 169 | 0.367389 | |
| 170 | 0.367002 | |
| 171 | 0.364646 | |
| 172 | 0.363042 | |
| 173 | 0.362691 | |
| 174 | 0.361843 | |
| 175 | 0.359432 | |
| 176 | 0.360388 | |
| 177 | 0.362460 | |
| 178 | 0.363344 | |
| 179 | 0.363111 | |
| 180 | 0.362587 | |

FIG. 8

METHODS, SYSTEMS, AND APPARATUS TO SYNCHRONIZE ACTIONS OF AUDIO SOURCE MONITORS

RELATED APPLICATION

This patent arises from a continuation of U.S. patent application Ser. No. 12/968,677, filed on Dec. 15, 2010, now U.S. Pat. No. 8,855,101, which claims the benefit of U.S. Provisional Patent Application Ser. No. 61/311,893, which was filed on Mar. 9, 2010, all of which are hereby incorporated herein by reference in their entireties.

FIELD OF THE DISCLOSURE

This disclosure relates generally to market research and, more particularly, to methods, systems, and apparatus to synchronize actions of audio source monitors.

BACKGROUND

Audience measurement activities occur in consumer households, shopping areas (e.g., stores, malls, etc.), and other areas where people may be exposed to advertisements and/or other media. To identify when a consumer was exposed to media content, what the media content contains and/or where the exposure to the media occurred, the consumer may be equipped with a mobile unit to record portions of the media content exposed to the consumer.

In some examples, the consumer is equipped with a mobile unit to record audio that may be present in an area to be monitored. Presented or rendered media, such as an advertisement or a kiosk feature presentation (e.g., at a library, a museum, an amusement park, etc.) may be presented in proximity to a base unit that can also collect audio information (e.g., a portion of presented media content). When both the mobile unit and the base unit collect audio information, one or more post-processing activities may be employed to match the collected mobile unit audio information with the collected base unit information, thereby allowing identification of consumer location and/or the type of media content to which the consumer was exposed.

BRIEF DESCRIPTION OF THE DRAWINGS

FIGS. 7D and 8 illustrate example lists of correlation values calculated by the system of FIG. 1.

DETAILED DESCRIPTION

Figure 1:
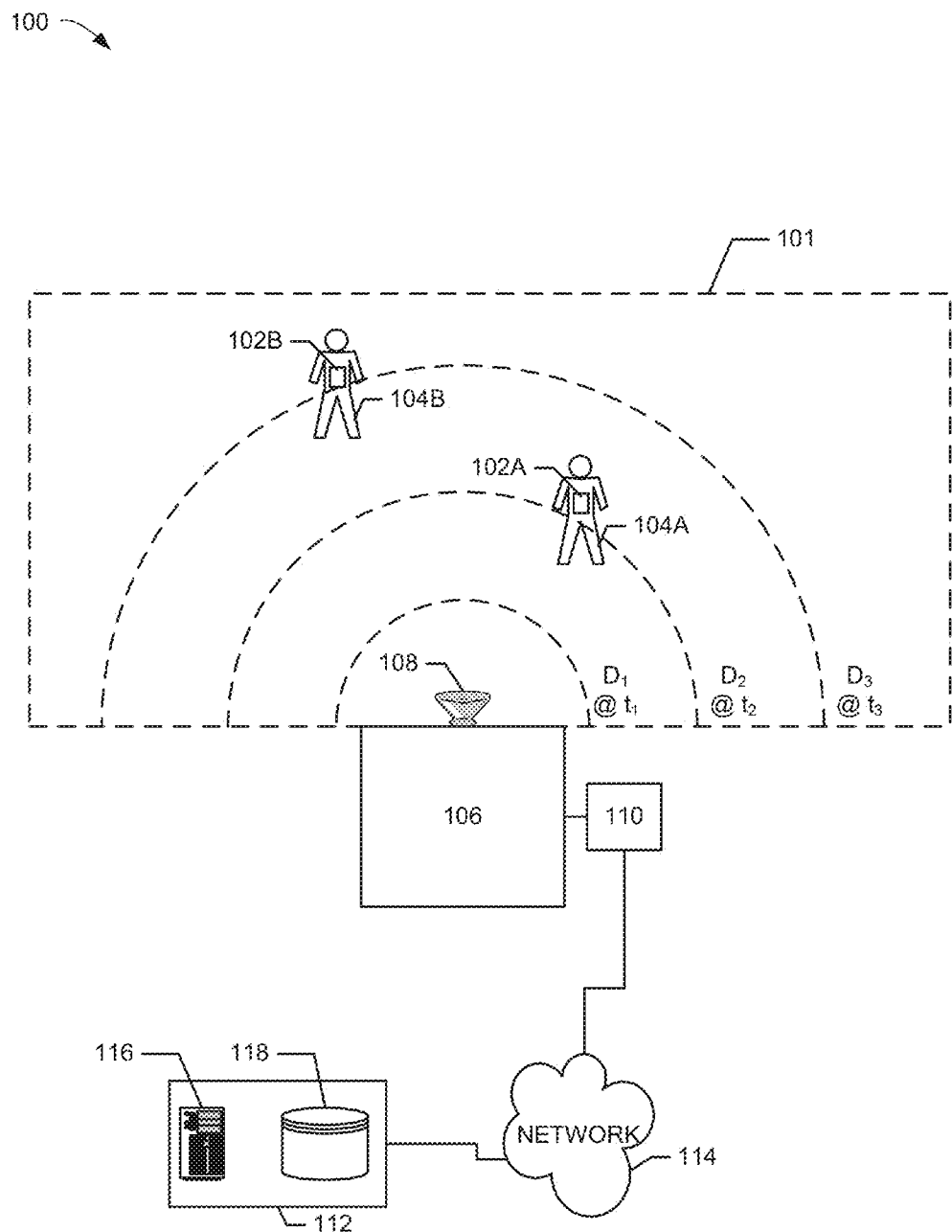
FIG. 1 is a schematic illustration of an example system to calculate distance from an audio source.

Although the following discloses example methods, systems, apparatus and articles of manufacture including, among other components, software executed on hardware, it should be noted that such methods, systems, apparatus and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, apparatus and articles of manufacture, such examples are provided are not the only way to implement the methods and apparatus described herein.

The example methods, systems, apparatus and articles of manufacture described herein may be used to analyze the movements of audience members in the course of their exposure to media sources or media presentations to aid in determining whether such media presentations were actually consumed (e.g., viewed, listened to, etc.) by the audience members. In some example implementations, the audience members may be panelist members that are statistically selected to participate in a market research study. However, in other example implementations, the audience members need not be panelist members. While mere proximity to media sources reflects an audience member's exposure, determining whether the audience member was paying attention to, consumed, and/or was engaged with such media sources requires more than proximity. For example, knowledge of an audience member's location being 5-feet from a media source (e.g., television) at one moment in time indicates exposure. However, such an audience member detected 5-feet from the media source for several moments in time (e.g., over a span of 30 minutes) indicates that the audience member may be consuming (e.g., engaged-with, paying attention to, etc.) the media presentation. Accordingly, location determination allows valuable audience member data to be collected so that media exposure and/or consumption behavior may be determined.

In particular, the example methods, systems, apparatus and articles of manufacture described herein may be implemented using, for example, tags worn or carried by audience members, and may be used to collect audience member movement information and/or media exposure information. Additionally, the movement and/or exposure information may be detected relative to media sources (e.g., a set-top box, television, stereo, an in-store display, an amusement park kiosk, a billboard, etc.) and used to determine the behavior of an audience member to thereby enable an inference as to whether the audience member is consuming media presentations. In this manner, media presentations (e.g., audio, video, still images, Internet information, computer information, billboards, etc.) may be given appropriate media consumption credit.

The example methods, systems, apparatus and articles of manufacture described herein may also be used to align an action in time between a base unit and a mobile unit. As described above, tags (e.g., bracelets, pendants or other items capable of collecting audience member information) may be worn or carried by audience members. These tags may communicate with one or more base units in an area to be monitored. The tags operate on battery power and, thus, require periodic recharging and/or replacement. As processing power of the tag circuitry increases, the amount of available field operation time decreases due to increased electrical energy requirements.

In some circumstances, a tag and a base unit attempt to begin capturing information (or other action) in an area at the same time. To ensure that a measurement of time between the tag and the base unit are synchronized, some tags employ a Real Time Clock (RTC) device, such as RTCs manufactured by Texas Instruments®, Maxim®, Intersil®, etc. However, the RTC consumes additional energy from the battery and consumes circuit board real estate that causes the tag to be larger. In other examples, the RTC causes problems related to granularity and accuracy because, in part, the RTC drifts approximately one to two seconds per day in a random manner. Over the course of months of tag operation in the field, such drift causes substantial difficulty when matching audio information between tags and base units. However, the example methods, systems, apparatus and article of manufacture described herein synchronize actions between the tag and base unit in a manner that does not require an RTC device.

Turning to FIG. 1, for purposes of clarity and efficiency the example tag distance calculation system 100 and corresponding methods, apparatus and articles of manufacture are described herein with respect to an example area 101. The example area 101 may include, but is not limited to a household room, a retail establishment, a shopping mall, a street area and/or an amusement park. Information about an audience member's behavior may be determined/estimated using location information relative to a media source and/or audience member motion information. Location information may include, for example, position information that, when analyzed, may be used to determine the movements of a person or an audience member from one location to another. Location information may also include distances between an audience member and a media source, such as, for example, a home entertainment center, television, and/or a set-top box (STB) that resides in a household. Example location detection devices described below may be worn or otherwise carried by a person or audience member.

The example area 101, in which the example methods, systems, apparatus and articles of manufacture of the present disclosure may operate, includes example tags 102A, 102B worn by respective audience members 104A, 104B. Tags may include, but are not limited to, bracelets, necklaces, broaches, pendants, belt attachment(s) and/or other relatively small and/or unobtrusive battery powered devices carried by the audience members. The example area 101 also includes an example media delivery center 106 to generate media audio signals from one or more speakers 108. The example media delivery center 106 may include one or more media delivery devices (e.g., a television, a radio, etc.) and/or one or more media playback devices (e.g., a DVD player, a VCR, a video game console, etc.). In the illustrated example of FIG. 1, audio signals emitted from the one or more speakers 108 propagate throughout the area 101. Generally speaking, the speed at which the audio signals propagate is dependent upon atmospheric conditions including air temperature and humidity and will be assumed herein to be 13,041.6 inches per second (331.25 meters per second or approximately 741 miles/hr). In the event the example speaker 108 emits a sound at time zero ($t_0$), the emitted sound will reach a distance $D_1$ at a first time ($t_1$). Similarly, the emitted sound will continue to propagate to distances $D_2$ and $D_3$ at corresponding times $t_2$ and $t_3$.

The example area 101 also includes one or more base units 110. The base unit 110 may interact with the tags 102 for battery charging and/or data transfer operations, as discussed in further detail below. Additionally, the base unit 110 of the illustrated example is configured to work cooperatively with the tags 102 to substantially continuously generate location information of the audience members 104A, 104B relative to the location of the example media delivery center 106 as the audience member 104 moves among areas within, around, and/or outside the example area 101. The base unit 110 of the illustrated example is configured primarily as a stationary device disposed on or near the media delivery center 106 to perform one or more media (e.g., television, radio, Internet, etc.) metering methods. Depending on the types of metering that the base unit 110 (also referred to as a "set meter") is adapted to perform, the base unit 110 may be physically coupled to the media delivery center 106 or may instead be configured to capture signals emitted externally by the media delivery center 106 (e.g., audio emitted from the example speaker 108) such that direct physical coupling to the media delivery center 106 is not employed.

In the illustrated example, information collected by the base unit 110 and/or the tags 102 is provided to a central facility 112. In the example of FIG. 1, a network 114 is employed to transfer data to/from the example central facility 112. The network 114 may be implemented using any suitable communication system including, for example, a telephone system, a cable system, a satellite system, a cellular communication system, AC power lines, a network, the Internet, etc. The example central facility 112 of FIG. 1 is remotely located from the area 101 and is communicatively coupled to the base unit 110 via the network 114. The central facility 112 may obtain media exposure data, consumption data, media monitoring data, location information, motion information, and/or any other monitoring data that is collected by one or more media monitoring devices such as, for example, the tags 102.

In an example implementation, the central facility 112 includes a server 116 and a database 118. The database 118 may be implemented using any suitable memory and/or data storage apparatus and techniques. The server 116 may be implemented using, for example, a processor system similar or identical to the example processor system P100 depicted in FIG. 16. In the illustrated example, the server 116 is configured to store information collected from the tags 102 and/or base units 110 in the database 118 and to analyze the information.

Figure 2:
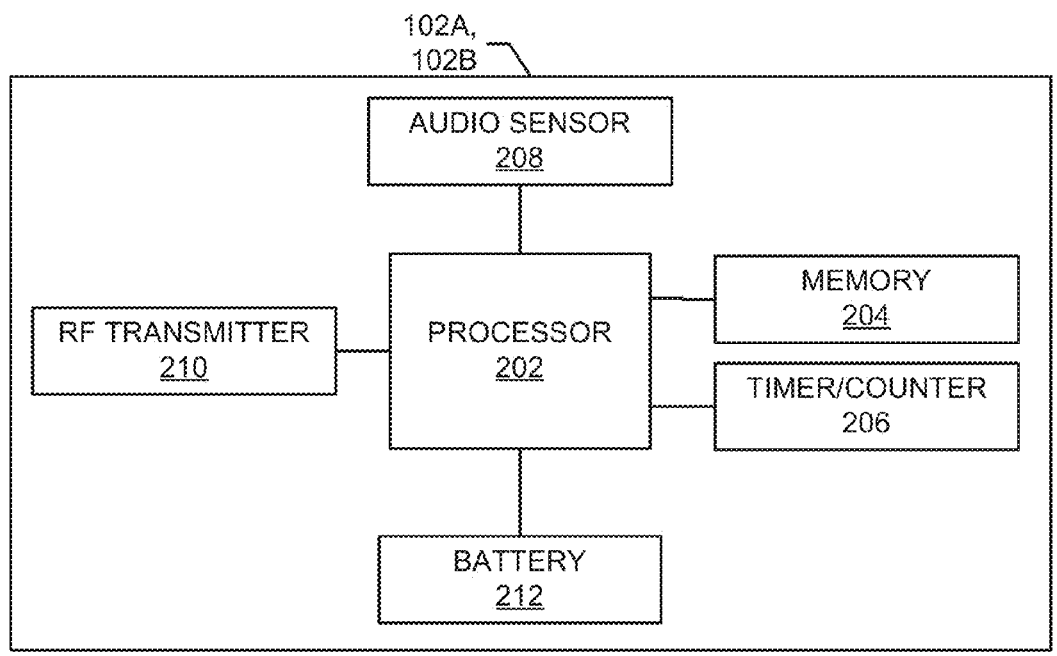
FIG. 2 is a schematic illustration of an example tag device for use in the system of FIG. 1.

Turning to FIG. 2, an example tag 102A, 102B may be worn or carried by an audience member (e.g., the audience member 104A) to enable determination of the distance the audience member is from the example media delivery center 106. The example tag 102 of FIG. 2 captures audio information that is exposed to the carrier (e.g., audience member 104A), reduces, decimates and/or otherwise processes the captured audio information to reduce memory storage and/or processing requirements, and transmits a reduced set of audio information back to the base unit 110 as one or more packaged RF signals. At least one benefit realized in response to decimating the audio information received by the example tag 102A, 102B is that battery life is improved as a result of reducing an amount of data transmitted to the base unit 110, thereby permitting the example tag 102A, 102B to operate in an environment for a greater amount of time before requiring recharging and/or battery replacement.

As described in further detail below, the example tag 102A, 102B initiates a request to determine a distance between the tag 102A, 102B and the base unit 110 near an audio source, such as the example speaker 108. The tag 102A, 102B emits an RF initialization pulse, which propagates at the speed of light toward the base unit 110, to initiate audio sampling of the example area 101. Both the tag 102A, 102B and the base unit 110 may begin audio sampling at substantially the same time, and the tag 102A, 102B triggers the end of audio sampling by sending a subsequent RF signal to the base unit 110 containing a representation of collected audio data by the tag 102A, 102B. In some examples, the tag 102A, 102B is expected to operate in the example area 101 (e.g., a room, a portion of a street, an amusement park waiting line, etc.), thereby maintaining an opportunity of constant communication and/or accessibility to the example base unit 110. In other examples, the tag 102A, 102B may be removed from the example area 101 for periods of time. For instance, in the event that the example tag 102A, 102B is provided to an amusement park attendee, the amusement park may include any number of example areas 101 in which a distance calculation may be initiated. However, during instances where the amusement park attendee is walking to/from areas of the amusement park, the example tag 102A, 102B may not be able to communicate with a base unit, such as the example base unit 110 of FIGS. 1 and 3. To prevent the example tag 102A, 102B from wasting battery resources by transmitting one or more sets of collected audio data via an RF transmission, the example tag 102A, 102B may utilize the example RF transmitter in a bi-directional manner. For instance, after transmitting the initialization RF signal to any available base unit 110, the example tag 102A, 102B may wait for acknowledgement from the base unit 110 via a base unit RF acknowledgement signal. If the tag 102A, 102B fails to receive such an RF acknowledgement signal within a threshold amount of time, the tag 102A, 102B refrains from further audio collection activities for a period of time. However, if the tag 102A, 102B receives an RF acknowledgement signal within the threshold amount of time, then the tag 102A, 102B proceeds to capture ambient audio signal data, decimate the captured audio data to reduce an RF transmission bandwidth, and transmit such decimated captured audio data to the base unit 110.

The example base unit 110 processes the received audio data to determine a match between the tag 102A, 102B audio data and the collected base unit 110 audio data. The base unit may calculate a number of samples that elapse between the RF initialization pulse and the matching-point of the audio data to determine how much time elapsed between the sound received by the base unit 110 versus the tag 102A, 102B. Additionally, because the propagation speed of sound is known, a distance value may be calculated by the base unit 110 to represent the distance between the tag 102A, 102B and the base unit 110.

In the illustrated example of FIG. 2, the tag 102 includes a processor 202, a memory 204, a timer/counter 206, an audio sensor 208, a radio frequency (RF) transmitter 210, and a battery 212. In operation, the example processor 202 invokes the RF transmitter 210 to emit an initialization RF signal to be received by the example base unit 110 of FIG. 1. The initialization RF signal facilitates data acquisition synchronization between the base unit 110 and the tag 102 because, for all practical purposes, both the base unit 110 and the tag 102 receive the RF signal at the same time. On the other hand, any sound emitted from the example speaker 108 propagates at a substantially slower rate than the RF signal, which can provide an indication of distance based on any measured time lag of the audio propagation. In response to receipt of the initialization RF pulse/signal the example base unit 110 and the tag 102 to begin accumulating audio within the example area 101. After initialization, audio samples are detected and/or otherwise collected by the example tag audio sensor 208. The audio sensor 208 may be a microphone in communication with the processor 202 to collect audio samples at a sample rate. After some time period during which audio samples are collected, a subset of the collected audio samples is transmitted back to the example base unit 110. This subset of samples is used to determine a distance between the tag 102 and the base unit 110. The base unit 110 also collects audio samples, which are typically received from the audio source 108 before they are received by the tag 102 due to closer proximity of the base unit 110 to the audio source 108. However, some of the audio samples collected by the tag 102 will not be collected by the base unit 110 due to the propagation delay of sound from the source 108 to the tag 102, as described in further detail below.

After collecting data for a period of time, as set by the example timer/counter 206 (e.g., five seconds worth of data), the tag 102 transmits a subset of the data to the base unit 110 for analysis. The subset of the audio samples that is transmitted back to the example base unit 110 is less than the total amount of data that is presented to the tag 102, thereby substantially conserving battery power. As described in further detail below, the base unit 110 receives the initialization RF signal to begin collecting data and stops collecting data when the example tag 102 begins to transmit its subset of collected audio data. The base unit 110 employs cues from the initialization RF signal and the received subset of audio samples from the tag 102 to calculate one or more distance values.

Generally speaking, presently existing microphones and corresponding data collection hardware and/or software (e.g., executing on the example processor 202) capture audio at, for example, 8000 samples per second (sample rate). Additionally, if the speed of sound is approximately 13,041.6 inches every second, an 8 kHz sample rate may correspond to a distance of 1.6 inches per sample. While a sample rate of 8 kHz allows a sample to be collected once every 125 microseconds (125 µS), such a high sample rate results in a relatively large amount of data to be transmitted by the tag 102 via the example RF transmitter 210. Moreover, such a high sample rate may not be needed when matching one or more sets of collected audio samples from the tag 102 with one or more sets of collected audio samples from the example base unit 110. Thus, the example tag 102 may send a subset of audio data to the base unit 110 that is indicative of an audio envelope rather than a detailed audio signature. Furthermore, for instances in which the example tag 102 is to provide a general indication of relative distance between itself and the example base unit 110, high sample rate may not be necessary. As described in further detail below, the methods, systems, apparatus and articles of manufacture described herein employ the audio data envelope collected by the example tag 102 and an audio data signature collected by the example base unit 110 to ascertain a relative distance between the example tag 102 and the base unit 110. As used herein, an audio data envelope represents audio data having a smaller amount of information than the data from which it is derived (e.g., an audio signature). Reduction of the information of an audio signature is described in further detail below and may include, but is not limited to decimating an audio signature and/or applying one or more scale factors to an audio signature.

Figure 3:
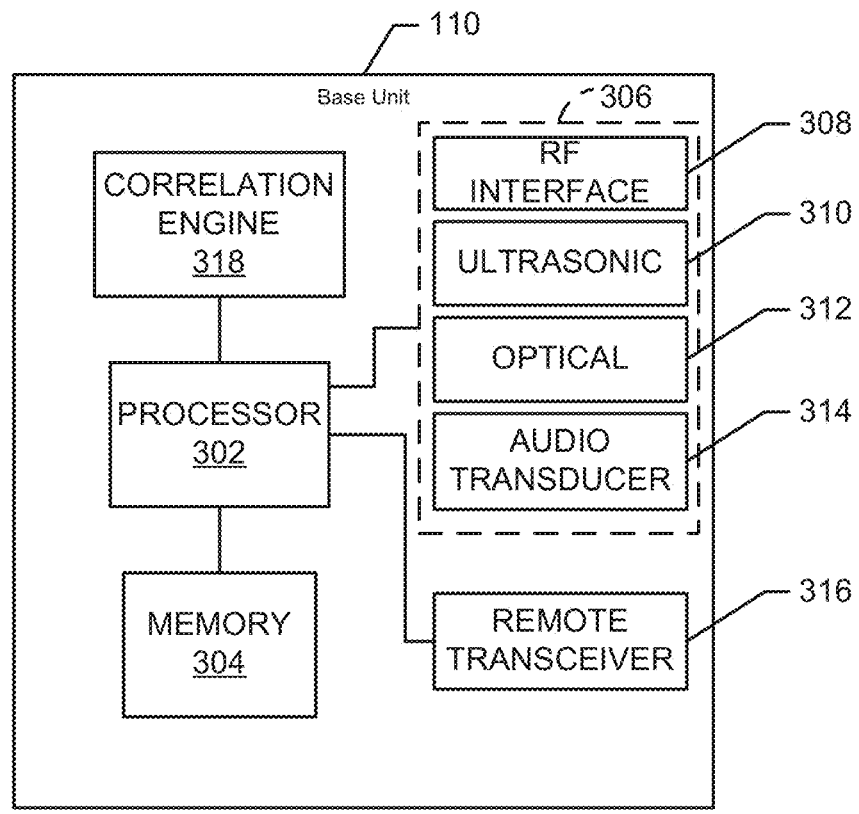
FIG. 3 is a schematic illustration of an example base unit for use in the system of FIG. 1.

FIG. 3 is a block diagram of the example base unit 110 of FIG. 1. As shown in FIG. 3, the example base unit 110 includes a processor 302, a memory 304, and a plurality of sensors and/or transducers 306. In the illustrated example, such sensors and/or transducers 306 include an RF interface 308, an ultrasonic transceiver 310, an optical sensor and/or transmitter (e.g., transceiver) 312, and an audio transducer 314. The following example focuses on a base unit 110 that includes any of the RF interface 308 and the audio transducer 314, but, as noted, other example base unit(s) 110 may include additional or alternate structure(s). The example base unit 110 also includes a remote transceiver 316 that receives the monitoring data collected and/or processed by the base unit 110 and/or received by the tag 102 and sends it to, for example, the central facility 112 (FIG. 1). The example base unit 114 of FIG. 1 also includes a correlation engine 318, which is communicatively coupled to the processor 302 as shown to facilitate one or more correlation calculations between tag 102 audio signals and base unit 110 audio signals, as described below in connection with FIG. 16. The example correlation engine 318 may employ any type of statistical and/or correlation algorithm on received data such as, but not limited to a normalized correlation, Pearson correlation coefficients and/or rank correlation coefficients.

The processor 302 is used to control and/or perform various operations or features of the base unit 110 and may be implemented using any suitable processor, including any general purpose processor, application specific integrated circuit (ASIC), logic circuit, digital signal processor (DSP), or any combination thereof. For example, the processor 302 may be configured to receive location information, motion information, audio information and/or media monitoring information. Information collected may be stored in the memory 304 and communicated to the central facility 118 either in its collected form or a format for further processing.

The processor 302 of the illustrated example is configured to control communication processes that occur between the base unit 110 and other processing systems (e.g., the central facility 118). The processor 302 may cause the remote transceiver 316 to communicate monitored, collected, calculated and/or raw audio data to, for example, to the central facility 118 (FIG. 1). Additionally, the processor 302 and/or the memory of the base unit 110 may be programmed to carry out the processes of FIGS. 5 and/or 7A below.

The memory 304 is substantially similar or identical to the memory 204 (FIG. 2) and may be used to store program instructions (e.g., software, firmware, etc.), data (e.g., location information, motion information, media monitoring information, audio samples, etc.), and/or any other data or information.

The RF interface 308 may be implemented using a transmitter, a receiver, or a transceiver. The RF interface 308 may be configured to transmit and/or receive location-related information and/or to communicate with the RF transmitter 210 (FIG. 2) of the tag 102. However, to reduce power consumption by the example tag 102, the example RF interface 308 is configured to receive information from, not send information to, the example RF transmitter 210, thereby eliminating any need for the tag 102 to consume battery 212 power listening for communication(s) from the example RF interface 308. Where multiple tags 102 are present, each tag 102 is assigned a unique code (e.g., a digital signature of bits, an RF signature, etc.) to enable the base unit 110 to identify the data it receives as associated with a corresponding tag and to distinguish tags when calculating relative distances therebetween.

The RF interface 308 is configured to receive RF information from the tag 102 indicative of one or more sets of collected and decimated audio samples. For example, the RF interface 308 may receive a set of audio samples that have been packaged into an RF-transmittable format by the example tag 102. As described above, where multiple tags 102 are present, each tag 102 is assigned a unique code to enable the base unit 110 to distinguish which tag(s) have initiated a data collection request (e.g., an RF initialization signal) and/or the tag(s) associated with received sets of audio samples. The RF interface 308 may be implemented using any suitable RF communication device such as, for example, a cellular communication transceiver, a Bluetooth® transceiver, an 802.11 transceiver, an ultrawideband RF transceiver, etc.

The remote transceiver 316 of the illustrated example is used to communicate information between the base unit 110 and, for example, the central facility 112 (FIG. 1). The remote transceiver 316 is communicatively coupled to the network 114 and may be implemented using any suitable wired or wireless communication transceiver including, for example, a telephone modem, a DSL modem, a cable modem, a cellular communication circuit, an Ethernet communication circuit, an 802.11 communication circuit, a powerline modem, etc. The remote transceiver 316 may be used to communicate media monitoring information (e.g., audio samples, codes, and/or signatures), location information, and/or motion information to the central facility 112 via the network 114.

Figure 4:
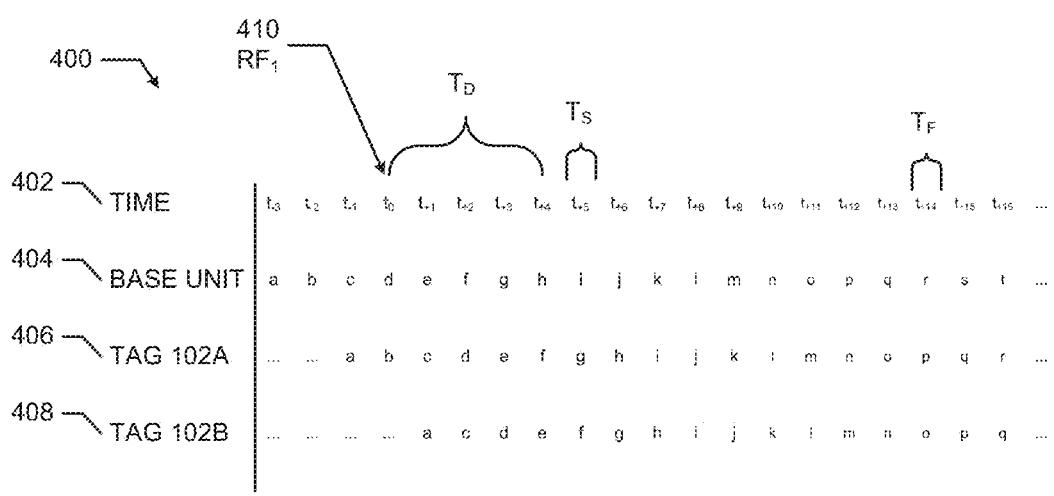
FIG. 4 is an example timing diagram associated with audio sample timing between the example tag device and base unit of FIGS. 1-3.

FIG. 4 illustrates an example wireless tag timing diagram 400 indicative of audio samples received by the example base unit 110 and two example wireless tags, such as the example tags 102A and 102B of FIG. 2. In the illustrated timing diagram 400 of FIG. 4, a timing row 402 identifies data sample timing units ranging from $t_{-3}$ to $t_{+16}$ timing units. Each timing unit in the example timing row 402 is indicative of an amount of time that corresponds to a data rate of the tag 102. As described above, currently existing microphones and/or corresponding driver hardware/software typically sample audio data at a rate of 8 kHz (although such rates may be superseded with newer technologies developed during the lifetime of this patent). However, in the illustrated example of FIG. 4, each timing unit (e.g., $t_{-1}$, $t_0$, $t_{+1}$, ..., etc.) represents a sample rate decimated by a factor of five (5). The decimation factor described herein is selected as an example value of five for purposes of discussion and not limitation, thus, any other value may be selected. In the illustrated example of FIG. 4, each timing unit represents a span of 625 μS. As described in further detail below, while the example tag (e.g., 102A) returns one or more subsets of audio data (via the example RF transmitter 210) at a decimated rate, thereby reducing the volume of data to be transmitted by the example RF transmitter 210, the example base unit 110 may capture audio data at the same rate or capture at a higher data rate (e.g., 8 kHz) because it is unconcerned and/or less concerned with power savings than the battery powered tags.

In the illustrated example timing diagram 400 of FIG. 4, a base unit row 404 indicates which audio samples occurred at the base unit 110 at the corresponding timing row 402 timing unit, a tag 102A row 406 indicates which audio samples occurred at a first tag 102A (e.g., a bracelet worn by an audience member) at a corresponding time as indicated by the timing row 402, and a tag 102B row 408 indicates which audio samples occurred at a second tag 102B at a corresponding time as indicated by the timing row 402. The illustrated example timing diagram 400 reflects an RF initialization signal or packet 410 to identify when a tag (e.g., tag 102A) emitted an indication that the tag 102A is beginning to collect audio samples, thereby triggering capturing of audio samples at the base unit. As used herein, an RF signal, such as an RF initialization signal, includes radio frequency energy emitted from a device, while an RF packet includes a radio frequency energy emitted from a device that also includes payload or other information, such as transmitter identification information. The terms signal or packet may be used interchangeably herein. In the illustrated example of FIG. 4, the tag 102A is responsible for the RF initialization signal 410, which is indicated by $RF_1$ at time $t_0$ from the example timing row 402. Receipt of $RF_1$ by the base unit 110 causes the base unit to begin saving audio samples to the memory 304. $RF_1$ also corresponds to the time at which the first tag 102A begins saving received audio samples.

To illustrate a relative time in which audio samples arrive at the example base unit 110, the first tag 102A and the second tag 102B, the example timing diagram 400 represents a series of audio samples using lower case letters "a" through "t." While the alphabetic representations "a" through "t" could be replaced by an analog audio signal representation(s), such as shown and described below in connection with FIG. 7B, the alphabetic representation is employed herein for ease of explanation. In the illustrated example, the base unit 110 is closer to the source of the audio samples than the tags 102A, 102B, and receives audio sample "a" at time $t_{-3}$ (see base unit row 404), while tag 102A does not receive audio sample "a" until time $t_{-1}$, and tag 102B does not receive audio sample "a" until time $t_{+1}$, which suggests that tag 102B is further away from the base unit 110 than tag 102A. In operation, the tag 102B transmits the $RF_1$ initialization signal 410 to indicate the beginning of a distance calculation. The tag 102A emits the $RF_1$ signal at substantially the same time it begins sampling ambient audio via its audio sensor 208 at time $t_0$. Additionally, the receipt of the $RF_1$ initialization signal 410 by the RF interface 308 of the example base unit 110 is, for all practical purposes, instantaneous due to its speed-of-light propagation. As a result, the tag 102A and the base unit 110 begin collecting data at substantially the same time.

Assuming that the tag 102A (corresponding to row 406) begins saving audio samples to memory immediately after the $RF_1$ initialization signal 410, any attempt to compare audio sample "c" with the same audio sample collected by the base unit 110 (corresponding to base unit row 404) will never result in a match. This is true because at the moment the $RF_1$ initialization signal 410 was transmitted by the tag 102, the sound energy corresponding to audio sample "c" had already propagated away from the base unit 110 (on its way to the tag 102). Accordingly, any attempt to compare collected audio samples "c" at tag 102A with collected base unit audio samples will result in failure and/or wasted processing resources. Furthermore, energy consumed by the tag 102A in sampling, storing and/or transmitting audio sample "c" to the base unit 110 is wasted and represents battery energy that could have otherwise been consumed sending data that has a chance of being matched to audio samples collected by the base unit 110.

To prevent transmitting wasted audio samples, the example tag 102A employs the timer/counter 206 to wait for a delay time $T_D$ before saving audio sample data to memory 204. The example delay time $T_D$ may be set to any value, such as a value that corresponds to the maximum size of a room or other monitored area of interest. For example, in the event that an analyzed room, such as the example area 101 of FIG. 1, is 12-feet long, then the delay time $T_D$ may be set for 11 milliseconds (mS), assuming that the speed of sound is 13,041.6 inches/second (not including atmospheric calibration). In that case, the chances of both the base unit 110 and any tag 102 in the example area 101 storing the same audio signals are relatively high versus when the delay time $T_D$ is set to any lower value. Upon the expiration of the delay time $T_D$, the example tag 102 begins saving audio signals as data samples to the memory 204 at a start time $T_S$ and stops saving data samples to the memory at a finish time $T_F$. In the illustrated example of FIG. 4, the start time $T_S$ occurs at time $t_{+5}$ and the finish time $T_F$ occurs at time $t_{+14}$. In other words, the example tag 102 saves ten (10) data samples to the memory 204 as a set, and sends the set of data samples (i.e., audio samples "g" through "p") to the example base unit 110 to, in part, signal to the base unit 110 that audio sample data acquisition should stop.

At this point, the base unit 110 has received the initialization signal $RF_1$, collected its own set of audio samples "d" through "r" (which are stored in a memory as data samples), has received the set of data samples from the tag 102A (i.e., audio samples "g" through "p"), but otherwise has no knowledge of how far the tag 102A is from the base unit 110. To calculate how far the tag 102A is from the base unit 110, the base unit 110 searches the received set of data samples from the tag 102A (i.e., audio samples "g" through "p") for a match corresponding to its own data samples. In the event that the example base unit 110 identifies that a match exists at its own data sample corresponding to audio sample "g," which was received by the base unit at time $t_{+3}$, the base unit 110 now has sufficient information to calculate a difference between time $t_{+3}$ and the time at which the initialization signal $RF_1$ was sent. In other words, the base unit 110 subtracts $t_{+3}$ from $t_{+5}$ to yield a difference of two time units. The number of time units may then be multiplied by the time per each unit, which may further be multiplied by the speed of sound to determine a relative distance between the base unit 110 and the tag 102. For example, in the event that each time unit t corresponds to 0.625 mS, then 1.25 mS (i.e., two time units of 0.625 mS each) multiplied by 13,041.6 inches per second yields a relative distance of 16.3 inches. After determining a distance between the tag 102 and the base unit 110, the stored set of audio samples from the tag 102A (i.e., "g" through "p") may be analyzed to identify the media content. Similarly, the stored set of data samples from the base unit 110 (i.e., stored audio samples "d" through "r") may be analyzed to identify whether the tag 102A data samples are the same as the base unit 110 data samples.

While the example tag distance calculation system 100 has been illustrated in FIGS. 1, 2 and 3, one or more of the interfaces, data structures, elements, processes, user interfaces, and/or devices illustrated in FIGS. 1-3 may be combined, divided, re-arranged, omitted, eliminated and/or implemented in any other way. Further, the example tags 102A, 102B, the example media delivery center 106, the example base unit 110, the example central facility 112, the example server 116, the example database 118, the example processor 202, the example memory 204, the example timer/counter 206, the example audio sensor 208, the example RF transmitter 210, the example processor 302, the example memory 304, the example sensors/transducers 306, the example RF interface 308, the example ultrasonic transceiver 310, the example optical sensor/transmitter 312, the example correlation engine 318 and/or the example audio transducer 314 of FIGS. 1-3 may be implemented by hardware, software, firmware and/or any combination of hardware, software and/or firmware. Additionally, as described in further detail below, the example test manager 1102, the example trigger monitor 1104, the example tag interface 1106, the example base unit interface 1108 and/or the example delay period adjustor of FIG. 11 may also be implemented by hardware, software, firmware and/or any combination of hardware, software and/or firmware. Thus, for example, any of the example tags 102A, 102B, the example media delivery center 106, the example base unit 110, the example central facility 112, the example server 116, the example database 118, the example processor 202, the example memory 204, the example timer/counter 206, the example audio sensor 208, the example RF transmitter 210, the example processor 302, the example memory 304, the example sensors/transducers 306, the example RF interface 308, the example ultrasonic transceiver 310, the example optical sensor/transmitter 312, the example correlation engine 318, the example audio transducer 314, the example test manager 1102, the example trigger monitor 1104, the example tag interface 1106, the example base unit interface 1108 and/or the example delay period adjustor may be implemented by one or more circuit(s), programmable processor(s), application specific integrated circuit(s) (ASIC(s)), programmable logic device(s) (PLD(s)) and/or field programmable logic device(s) (FPLD(s)), etc.

FIGS. 5, 6, 7A, 9, 12, 14, 15A and 15B illustrate example processes that may be performed to implement the example tag distance calculation system 100 of FIGS. 1-4 and 11. The example processes of FIGS. 5-7A, 9, 12, 14, 15A and 15B may be carried out by a processor, a controller and/or any other suitable processing device. For example, the example processes of FIGS. 5-7A, 9, 12, 14, 15A and 15B may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium. Alternatively, some or all of the example processes of FIGS. 5-7A, 9, 12, 14, 15A and 15B may be implemented using any combination(s) of ASIC(s), PLD(s), FPLD(s), discrete logic, hardware, firmware, etc. Also, one or more of the example processes of FIGS. 5-7A, 9, 12, 14, 15A and 15B may instead be implemented manually or as any combination of any of the foregoing techniques, for example, any combination of firmware, software, discrete logic and/or hardware. Further, many other methods of implementing the example operations of FIGS. 5-7A, 9, 12, 14, 15A and 15B may be employed. For example, the order of execution of the blocks may be changed, and/or one or more of the blocks described may be changed, eliminated, sub-divided, or combined. Additionally, any or all of the example processes of FIGS. 5-7A, 9, 12, 14, 15A and 15B may be carried out sequentially and/or carried out in parallel by, for example, separate processing threads, processors, devices, discrete logic, circuits, etc.

Figure 5:
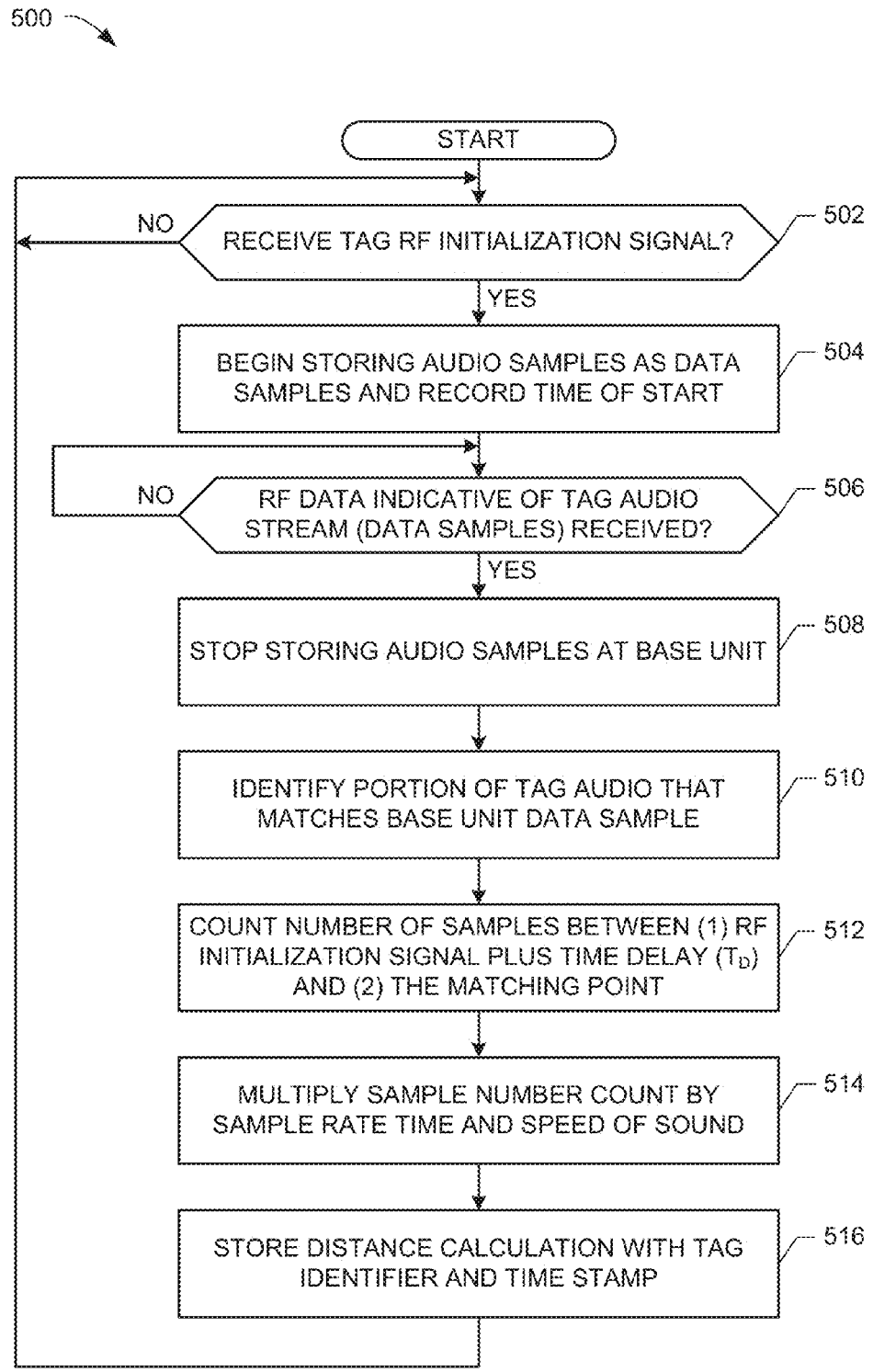
FIGS. 5, 6, 7A, 9, 12, 14, 15A and 15B are flowcharts representative of example processes that may be performed by, for example, the example system shown in FIG. 1.

The example process 500 of FIG. 5 begins with the processor 302 of the example base unit 110 monitoring for an RF initialization signal from one or more tags 102A via the example RF interface 308 (block 502). If no RF initialization signal is received, the example process 500 of FIG. 5 waits. Otherwise, after the RF interface 308 receives the RF initialization signal, the example processor 302 invokes the audio transducer 314 to begin storing received audio samples to the memory 304 (block 504). As described above, audio samples that are captured and stored to a memory are referred to herein as data samples. The example RF initialization signal may include identification information regarding which tag 102A is initiating a distance measurement. Each tag 102A, 102B may include a tag identifier that is embedded with the example RF initialization signal, such as $RF_1$ as described above in connection with FIG. 4.

The example base unit 110 continues to store the audio samples it detects via the example audio transducer 314 to the memory 304 (block 506), and stops recording audio samples upon receipt of an RF transmission indicative of tag 102A, 102B data samples (block 508). In other words, instances of distance measurement between a tag 102A, 102B and the base unit 110 are invoked by each tag 102A, 102B that may be present in the example area 101. By allowing each tag 102A, 102B to invoke nearby base unit(s), the tag(s) 102A, 102B may operate without continuous signal monitoring, which minimizes additional power consumption of the tag(s) 102A, 102B. In other examples, the base unit 110 does not wait for the RF transmission indicative of the tag 102A, 102B and, instead, collects a fixed amount of audio information. In such examples, block 506 is not needed.

The example base unit 110 parses the received data samples that were embedded in the RF signal transmitted by the tag 102A, 102B to identify a portion of audio samples that match the audio samples collected by the base unit (block 510). During base unit audio sample storage, the example base unit 110 stored a representation of the audio signal (e.g., one or more acoustic energy values, one or more acoustic frequency values, a series of values from a microphone, etc.) and a time (time stamp) at which the audio signal was saved to the base unit memory as one or more data samples 304. The example processor 302 counts a number of data samples that were stored between (1) the RF initialization signal plus the time delay ($T_D$) and (2) the point at which the base unit 110 audio signals match the tag 102 audio signal representations (block 512).

Each data sample saved by the base unit 110 is collected at a known frequency and is matched with a corresponding time stamp. For example, if the base unit 110 sample rate is set equal to that of the tag 102A (e.g., 1600 Hz), then each data sample is separated from an adjacent data sample by a time of 625 μS. As such, the number of data samples is multiplied by the time per data sample by the example processor 302, which is further multiplied by the speed of sound to calculate a distance value (block 514). The distance value calculation is stored in the memory 304 along with a time stamp (block 516) and the example base unit 110 returns to block 502 to await another RF initialization signal.

Figure 6:
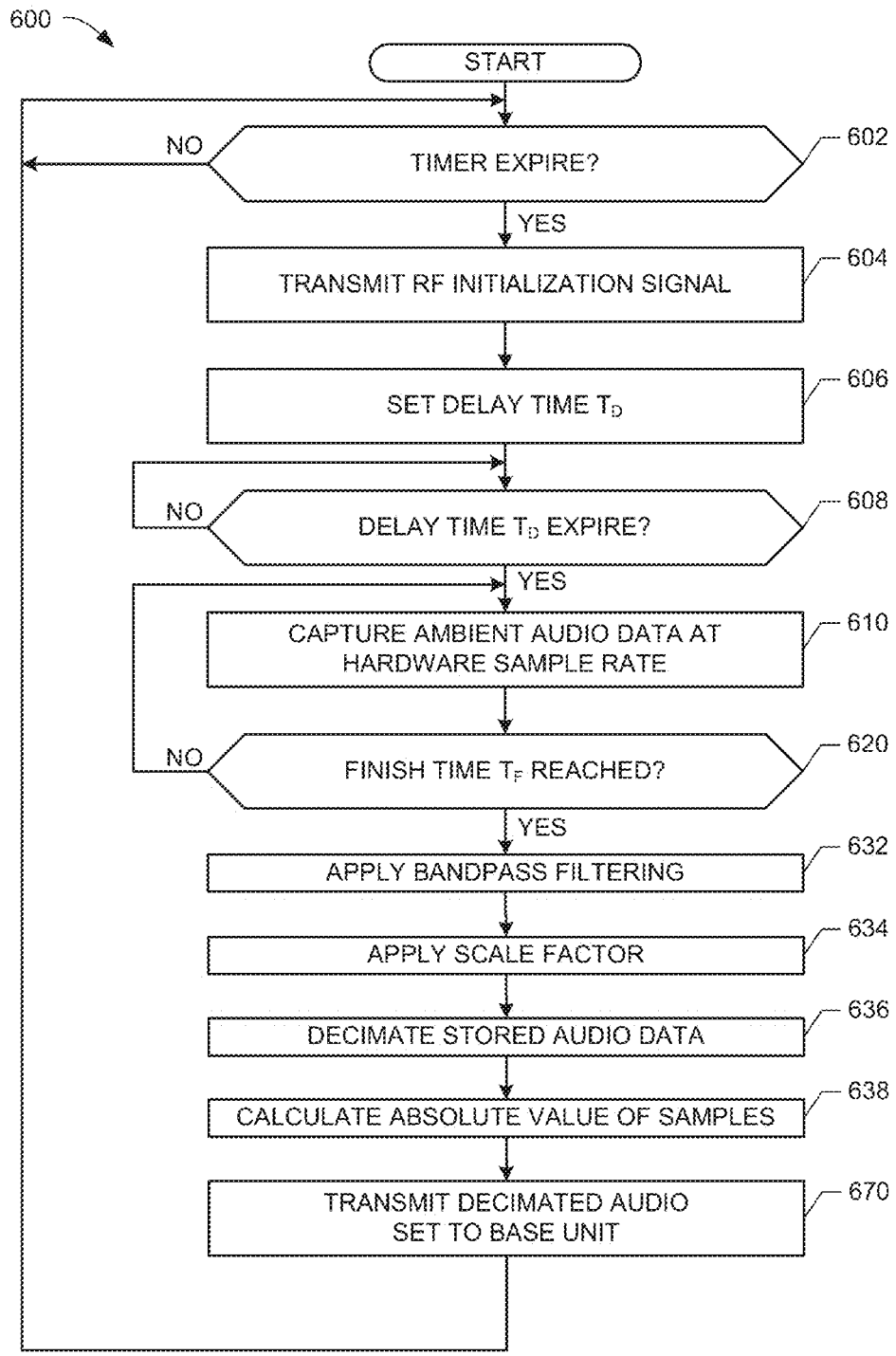

The example process 600 of FIG. 6 illustrates operation of the example tag 102A or 102B during a distance calculation. In the illustrated example of FIG. 6, the example processor 202 invokes the example timer/counter 206 to expire after a predetermined time period, such as a duration of every 10 minutes, for which a distance calculation is desired (block 602). While the time period has not expired (block 602), the example process 600 waits in a loop. However, when the example timer/counter 206 signals to the processor 202 that the time period has expired (block 602), the example processor 202 of the tag 102 invokes the example RF transmitter 210 to transmit an initialization signal to the base unit 110 (block 604).

As described above, the example tag 102A or 102B does not immediately start sampling and/or storing ambient audio samples to memory (i.e., storing audio samples to memory as data samples) immediately after transmission of the RF initialization signal because, in part, some of the initial audio samples would have already propagated past and has not been stored by the base unit 110 on its way to the tag 102A or 102B. As a result, the earliest audio samples collected by the tag 102A or 102B would never match audio sample(s) received at and/or stored by the base unit 110. Additionally, transmitting one or more data samples (i.e., audio samples collected and stored to a memory) from the tag 102A or 102B to the base unit 110 that have no possibility of resulting in a match, which needlessly consumes tag 102A or 102B battery resources. To minimize and/or eliminate wasted processing and/or transmission resources of the tag 102A or 102B, the example processor 202 invokes the timer/counter 206 to initiate a delay time $T_D$ (block 606). In effect, the delay time $T_D$ allows the example tag 102A or 102B to "catch-up" with the audio samples captured by the example base unit 110. If the timer/counter 206 does not indicate that the delay time $T_D$ has expired (block 608), then control loops to block 608 until the expiration of the delay time $T_D$.

When the delay time $T_D$ expires (block 608), the processor 202 causes the example audio sensor 208 to begin capturing audio samples (i.e., ambient audio information) at the sample rate designated by the tag 102A or 102B hardware configuration (block 610). As described above, industry standard audio capture devices and/or corresponding audio data acquisition software may capture at a default data rate, such as 8 kHz. In some instances, modification of audio data acquisition hardware and/or corresponding software may be cumbersome and/or difficult to access. In other instances, off-the-shelf audio data acquisition solutions may be desired to maintain simplicity and minimize cost of the example tag 102A or 102B. While processing and/or storage of audio data samples at a higher data rate may create a greater demand for battery power resources, such demands are of less importance than the substantially greater drain of battery power resources typically associated with packaging and transmission of RF data from the example tag 102A or 102B. As such, efforts to decimate collected audio samples are applied to the stored data samples before they are prepared for RF transmission, as described in further detail below.

If the finish time $T_F$ has not yet been reached (block 620), then the example process 600 of FIG. 6 returns to block 610 and the process continues to collect ambient audio samples. On the other hand, when the finish time $T_F$ has been reached (block 620), which indicates that the time period for audio sample acquisition has ended, the example processor 202 applies a bandpass filter (block 632). The bandpass filter may be facilitated by way of software executing on the example processor 202 or by way of one or more solid state filters (not shown). Bandpass filters may operate between, for example, 300 Hz to 3 kHz, and/or any other value(s) of interest. A scale factor (e.g., adjustable, fixed, variable, proportional to a percentage of source data, etc.) may be applied to the decimated audio data sample set (block 634) to further reduce an amount of data transmitted from the tag 102A, 102B to the base unit 110. For example, while many microprocessors and/or microcontrollers available accommodate register sizes of any number of bits (e.g., 8-bit, 12-bit, etc.), such full resolution of bits is not always needed for sufficiently accurate distance calculations and/or estimations. Accordingly, one or more scale factors may be applied to the data samples to reduce a number of bits needed per data sample (block 634).

In the illustrated example of FIG. 6, the processor 202 decimates the ambient audio data stored in the memory 204 (block 636). Data decimation may occur by, for example, accessing every $N^{th}$ audio data sample stored in the example memory 204, where N may be an integer value. For example systems 100 that employ audio sampling hardware at a rate of 8 kHz (i.e., 8000 samples of audio information collected every second), which yields a resolution of distance calculations within 1.6 inches between audio samples, the example tag 102A or 102B may employ a decimation factor (N) of, for example, twenty (20) for circumstances where greater resolution is not necessary. Any other decimation factor (N) may be employed, without limitation. An example decimation factor of twenty (20) substantially decreases the amount of audio data samples transmitted from the tag 102A, 102B to the base unit 110. While any value of N may be employed as the decimation factor to reduce the transmitted data volume from the tag 102A, 102B, higher decimation factors may affect the resolution of one or more calculated distance values of the tag 102A, 102B location. In other words, application of a decimation factor (N) includes a tradeoff between battery conservation with resolution.

Additionally, the example processor 202 calculates or determines an absolute value of the data samples saved to the example memory 204 (block 638), which may simplify binary representation(s) of the collected data samples. In other words, using the absolute value of the data samples (block 638) eliminates a need to process negative signage of one or more binary values.

The decimated set of data samples is then transmitted to the base unit (block 670), and control returns to block 602. Generally speaking, the example base unit 110 receives tag 102A, 102B data, receives audio samples acquired from the audio transducer 314, and then processes the received data to determine a distance value between the tag 102A, 102B and the base unit 110. In operation, after the example base unit 110 receives the tag 102A, 102B data samples, the received tag 102A, 102B data samples are expanded in a manner consistent with a decimation factor applied by the tag 102A, 102B. In the event that the example tag 102A, 102B applied a decimation factor of 20, then the base unit 110 reverses the decimation by expanding by the inverse of the factor. A moving average may be applied by the example base unit 110, such as an N-point moving average. In some examples, a moving average N of 20 produces satisfactory results, but any other value may be employed as desired. The example expansion and moving average produces curve data suitable for comparison purposes. As such, if the example tag 102A, 102B originally acquired audio samples at 8000 samples per second prior to decimating corresponding stored data samples by a factor of 20 (e.g., thereby transmitting 400 data samples), then the aforementioned expansion and moving average produces an 8000 sample per second data set suitable for one or more comparison(s).

As described above, the example base unit 110 also acquires audio samples from the audio transducer 314. In operation, the example base unit 110 subtracts each data sample (acquired from a corresponding audio sample) from a moving average of N past and current data samples. In some examples, a moving average value N of 8 produces satisfactory results, but any other value may be employed as desired. After determining an absolute value, the example base unit 110 applies a moving average of N points, such as 20. While an example moving average value N of 20 produces satisfactory results in certain environments, any other moving average value N may be employed as desired.

Prior to transmitting one or more decimated data sample sets to the example base unit 110, the example tag(s) 102A, 102B may also employ one or more compression techniques to the decimated and/or scaled data samples prior to RF transmission in an effort to further reduce an amount of transmitted data. Compression techniques may include, but are not limited to commercial compression techniques (e.g., gzip, which is free software released under the GNU General Public License) and binary run-length encoding.

In some examples, additional battery conservation may occur by eliminating the bandpass filter hardware and/or eliminating one or more bandpass filter calculations performed by the example processor 202 of the tag 102A, 102B. Although the effect of bandpass filtering may facilitate proper data processing by the tag 102A, 102B (e.g., removal of DC components, etc.), the computationally-intensive process of bandpass filtering may be replaced with a moving average process. In one example, a moving average is subtracted from the current data sample. The moving average may be calculated using Y data samples, which includes the current data sample and Y−1 prior data samples. For some example circumstances, a moving average value Y of 8 yields satisfactory results, but any other value(s) may be employed, as desired. During operation, the example moving average using the prior Y data samples may replace block 632 of the process 600 of FIG. 6.

In the event that more than one tag 102A, 102B operates in the example area 101 at the same time, the example base unit 110 may process each distance measurement request separately. For example, upon receipt of an RF initialization signal from the tag 102A, the base unit 110 may allocate processing resources, such as the processor 302, and memory 304 to store and/or process audio samples captured by the audio transducer 314. Further, if tag 102B also transmits an RF initialization signal, the base unit 110 may allocate the processing resources with a separate section of the memory 304 in which to store audio samples (as data samples) captured by the audio transducer 314. In other examples, any audio samples collected by the base unit 110 and stored to the memory 304 (as data samples) may be shared for overlapping time period(s), thereby conserving memory resources and may further reduce processing demands imposed upon the example processor 302. Each set of data captured and/or otherwise processed by the base unit 110 may be further associated with an indication of the tag 102A, 102B responsible for a distance calculation request.

Figure 7A:
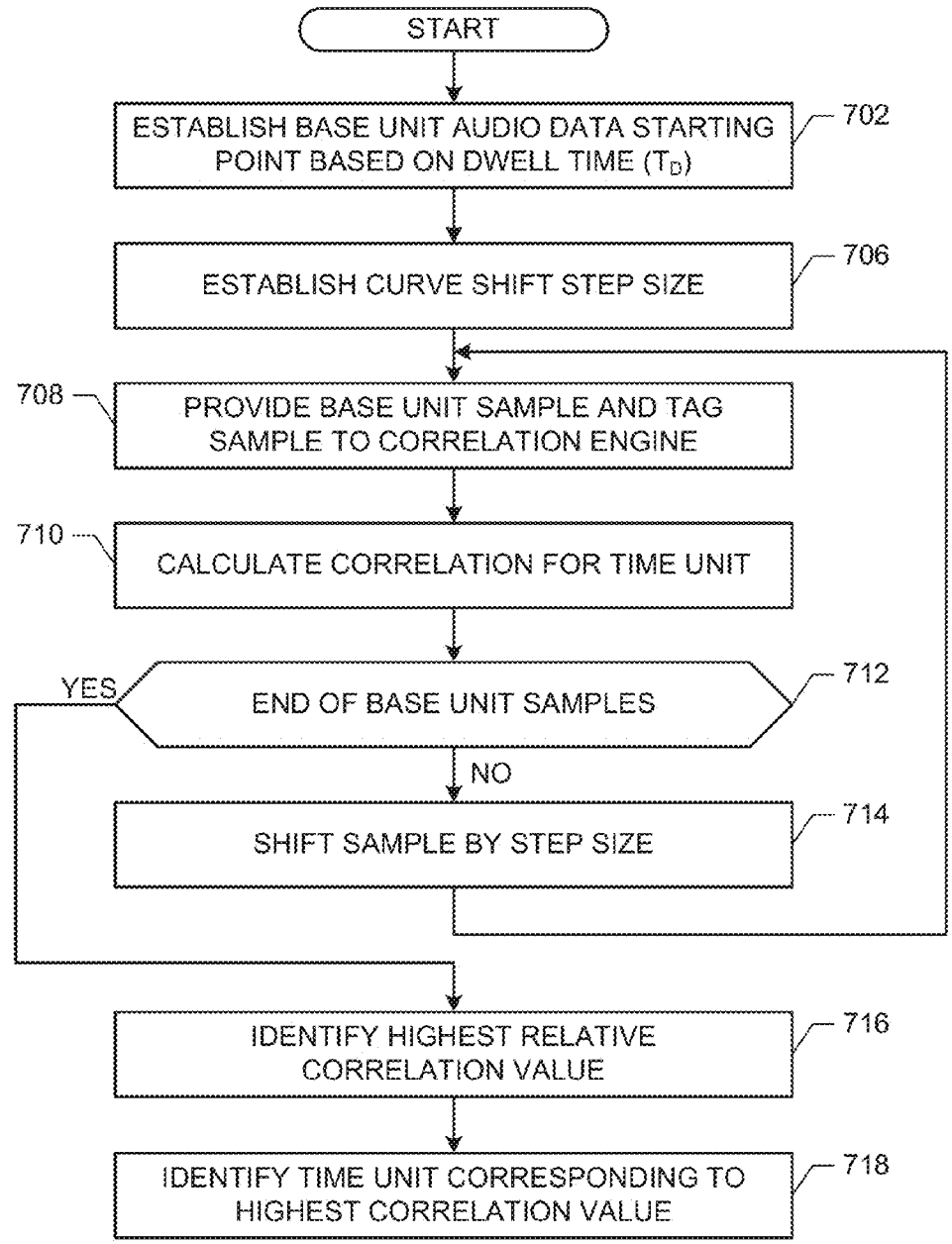

The example process 700 of FIG. 7A illustrates correlation based matching between data samples collected at the tag 102A, 102B and data samples collected at the base unit 110. The example process 700 of FIG. 7A may be executed to, in part, satisfy some or all of the procedures described in block 510 of the example process 500 of FIG. 5. As described above, the data samples stored in the memory 304 of the base unit 110 begin at the moment in time at which the RF initialization signal (see 410 of FIG. 4) was transmitted by the example tag 102A or 102B. However, because a portion of the earliest audio samples (and corresponding data samples) captured by the example tag 102A or 102B lack parity with the audio samples (and corresponding data samples) captured by the example base unit 110, the example correlation engine 318 establishes a base unit data sample starting point based on the delay or dwell time $T_D$ used by the example tag 102A or 102B (block 702). The dwell time $T_D$ allows any subsequent analysis, comparison and/or calculation of correlation values between the collected tag 102 data samples and the collected base unit 110 data samples to overlap with each other.

Figure 7B:
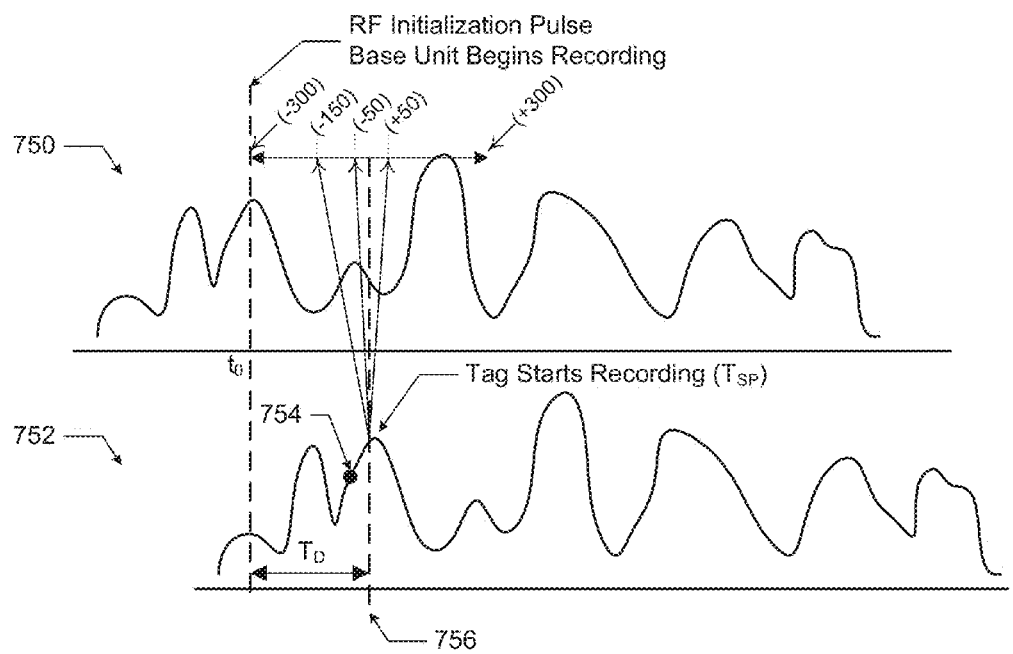
FIG. 7B illustrates example audio waveforms exposed to the example base unit and tag of FIGS. 1-3.

Turning briefly to FIG. 7B, a base unit audio waveform 750 (e.g., a plurality of audio samples in the example area 101) is captured by the base unit 110 at a time earlier than a tag audio waveform 752 due to the fact that the base unit 110 is closer to the audio source 108 than the tag 102A. At time $t_0$, an RF initialization pulse transmitted by the example tag 102A causes the base unit 110 to begin capturing audio samples. Additionally, at time $t_0$, the tag 102A is exposed to a portion of the audio waveform that has already passed the base unit 110 and may not be in the memory of the base unit 110. As described above, the example time delay ($T_D$) is selected to correspond to a maximum desirable distance from the base unit 110. In the event that the tag 102A, 102B is at a distance less than the distance corresponding to the maximum $T_D$ value, a portion of the tag 102A, 102B data samples prior to $T_D$ will be present in the base unit 110 memory 304. In other examples in which the tag 102A, 102B is near or immediately adjacent to the base unit 110, all of the data samples stored by the tag 102A, 102B will also likely be stored in the base unit 110 memory 304. In any event, to ensure certainty in comparisons and/or calculations with base unit 110 data samples and tag 102A, 102B data samples, comparisons only occur with such data that was collected after the expiration of $T_D$. As such, the example tag 102 refrains from saving data samples (corresponding to audio samples of the waveform 752) until after the delay time $T_D$ has expired to ensure that attempts to compare the example base unit audio waveform 750 and the example tag audio waveform 752 for a matching point(s) are successful.

While an overlap between the tag audio waveform 752 from the tag 102A and the base unit waveform 750 from the base unit 110 may allow for an identification of a match during one or more comparisons therebetween, which may illustrate a propagation time delay from the audio source to the tag 102A, there may be some circumstances in which it is desired to identify a strong lack of correlation. For instance, a strong lack of correlation is expected when audio samples captured by the tag 102A have not also been captured by the base unit 110, such as at an example offset point 754 of FIG. 7B. In the event that an attempt is made to calculate a correlation between the offset point 754 from the tag audio waveform 752 and $t_0$ of the base unit audio waveform 750, then a low, zero or negative correlation value is expected. However, upon shifting an analysis position within the tag audio waveform 752 over to the expiration of the time delay $T_D$ (756), an attempt to calculate a correlation between a tag data starting point $T_{SP}$ and $t_0$ of the base unit audio waveform 750 will result in a positive correlation value due to the similarity and/or exactness of the two waveforms (i.e., a match). In other words, circumstances in which a relatively strong negative correlation value transitions into a positive correlation value may be indicative of a point at which the base unit waveform 750 and the tag waveform 752 match.

In some examples, a value of $T_D$ (756) may be set to 300 time units, which corresponds to approximately 41 feet when each time unit occurs at a frequency of 8 kHz. However, in other examples a wide range of $T_D$ value(s) may be employed to ensure a peak in the correlation value(s) is detected. Once a $T_D$ value is chosen, such as an example value of 300, a compatible search range may be employed during the comparison (e.g., −300 to 0). In the event of uncertainty and/or concern for variability of system 100 performance, then the search range may be extended to include a number of both positive and negative time unit values (e.g., a range between −300 and 20, a range between −300 and 50, etc.). For circumstances in which the tag 102A, 102B and the base unit 110 data are swapped, a range between −300 and +300 may be employed for convenience. Range searches may be performed on tag 102A, 102B data samples and/or base unit 110 data samples, without limitation. However, in the event that one or more range searches are performed by the base unit 110, the example tag 102A, 102B does not need to consume additional battery power resources.

Figure 7C:
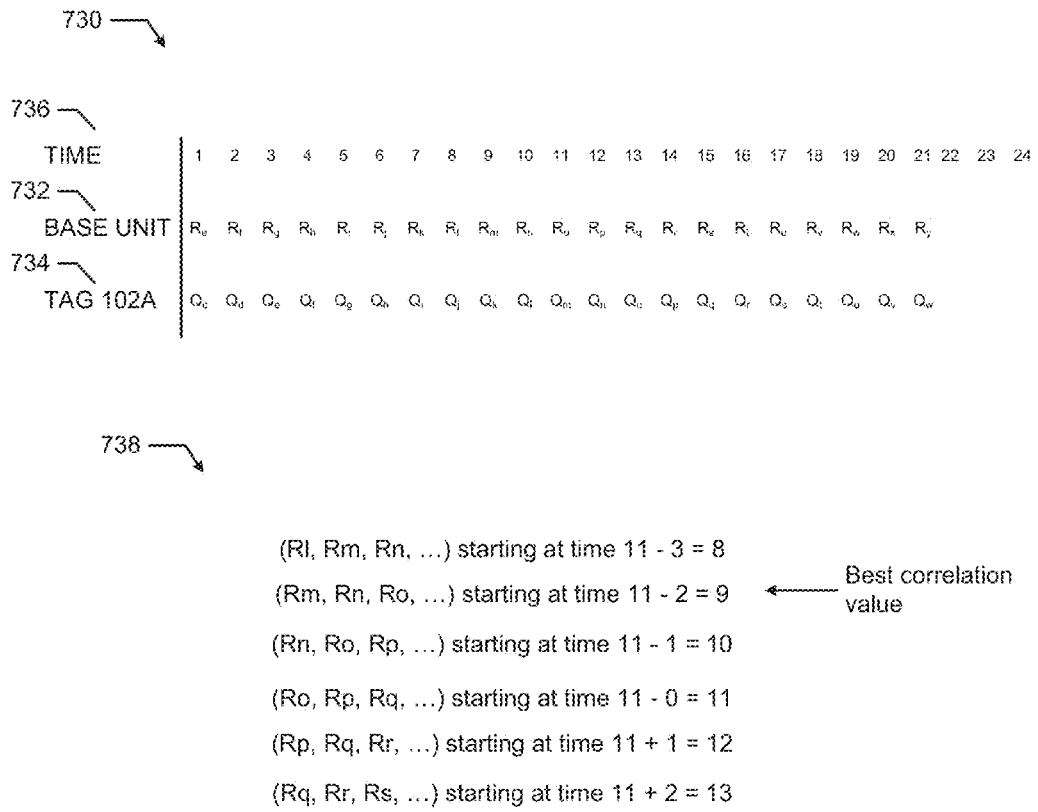
FIG. 7C illustrates a schematic of example base unit and tag data points.

In the illustrated example of FIG. 7C, a schematic illustration 730 of base unit 110 data samples 732 and tag 102A, 102B data samples 734 are shown relative to a timeline 736. Example base unit 110 reference samples 732 begin with sample $R_e$, while example tag 102A, 102B query samples 734 begin with sample $Q_c$, each at a time of 1 time unit. The example base unit 110 reference samples 732 represent a series of 4,000 data samples spaced ten (10) audio samples apart, which corresponds to a total width of 40,000 data samples when five (5) seconds of data are collected at 8,000 samples per second. Similarly, the example tag 102A, 102B reference samples 734 represent a series of 4,000 data samples spaced ten (10) audio samples apart from each other, which corresponds to a total width of 40,000 data samples when five (5) seconds of data are collected at 8,000 samples per second. Although the tag 102A, 102B reference points 734 will have matching reference samples to the base unit 110, one or more differences caused by, for example, noise and/or distortion may be present.

In the illustrated example of FIG. 7C, $T_D$ is set to a value of 10, and a sequence of tag 102A, 102B data is taken starting at sample $Q_m$. Any number of subsequent tag 102A, 102B data may be used as a subset of samples for comparison purposes (e.g., $Q_m$, $Q_n$, $Q_o$, $Q_p$, etc.). In the event that a search range from −3 to +3 time units is conducted, which may analogous to the example range of −300 to +300 described in connection with FIG. 7B, then the subset of tag 102A, 102B data samples may be compared to reference points centered around the time of 11 time units (i.e., the initialization time+$T_D$=1+10) (e.g., $R_l$, $R_m$, $R_n$, etc.). In other words, the subset of samples Qm, Qn, Qo, Qp, etc. are iterated during one or more comparisons with offsets of the reference points, as shown by an iteration sequence 738. Any search range value and/or step size may be employed by the methods, systems, apparatus and articles of manufacture described herein. For instance, in the event that an increase in comparison speed is desired, steps may be set to five (5) samples (i.e., approximately 8 inches) in view of a lower resolution tradeoff.

As shown in the illustrated example of FIG. 7C, the base unit 110 reference samples $R_m$, $R_n$, $R_o$ correspond to a local maximum correlation value, thereby indicating a likely match between audio samples collected at the base unit 110 and the tag 102A, 102B. The highest correlation value occurs at a relative offset of −2 samples, which further corresponds to a distance of 3.262 inches (assuming each sample equals 1.631 inches based on a speed of sound of 13,041.6 inches per second).

Returning to FIG. 7A, the example correlation engine 318 selects $T_D$ range value to increase the likelihood of waveform overlap during one or more comparisons between the base waveform 750 and the tag waveform 752. A curve shift step size is established and/or otherwise selected (block 706), which dictates the span of sample time unit sizes analyzed during one or more comparison(s). For example, if each sample was captured at 8 kHz, then a step size of 5 time units corresponds to a physical distance of approximately 8 inches (i.e., the distance that sound can travel in five time units).

For each step, a set of base unit data samples and tag data samples are provided to the example correlation engine 318 (block 708) and the example correlation engine 318 calculates a corresponding correlation value associated with the time unit (block 710). Data used by the example correlation engine 318 may occur by way of, for example, 4000 data samples having a separation of 10 time units therebetween. In other words, while an original example time unit of five (5) seconds at 8000 samples per second produces 40,000 data samples, the example separation of 10 time units substantially reduces the data load. Such a reduced data load reduces computational burdens on the example base unit 110. For example, if the first set of base unit data samples and tag data samples are provided to the correlation engine 318 at data sample number 80 (e.g., based on the selected starting point (block 702)), then data sample number 80 has a corresponding distance based on the distance sound travels for 80 units of time. Assuming, for purposes of explanation and not limitation, each unit of time corresponds to an 8 kHz data capture rate, then sound travels approximately 1.63 inches per sample period. Accordingly, 80 data samples corresponds to a distance of 10.9 feet. The example processor 302 counts a number of data samples that occurred between (1) the RF initialization signal plus the time delay ($T_D$) and (2) the point at which both waveforms (i.e., the tag 102A, 102B waveform 752 and the base unit 110 waveform 750) match with the highest correlation value. Each such counted sample corresponds to 1.63 inches of separation between the tag 102A, 102B and the base unit 110. If all the tag waveform 752 data samples have not been compared and/or correlated to one or more portions of the base unit waveform 750 (block 712), the tag data samples are shifted by the step size (block 714) and control returns to block 708. Otherwise, after all tag data samples have been calculated to find a corresponding correlation value (block 712), the example correlation engine 318 identifies a highest relative correlation value (block 716).

Briefly turning to FIG. 7D, an example list of correlation values 770 calculated by the correlation engine 318 are shown. The example list of correlation values 770 includes a time unit column 772 and a corresponding correlation value column 774. As described above, a higher correlation value is indicative of a greater likelihood that the data from the base waveform 750 and the tag waveform 752 match, while lower correlation values represent a lower likelihood that the waveforms match. As the example correlation engine 318 calculated and shifted through the data, as described above in connection with FIG. 7A, rows of correlation values with corresponding time units were saved to the memory 304 of the example base unit 110. Time unit 93 (a relative time) is identified by the example correlation engine 318 to have the highest relative correlation value within the list of correlation values 770 (block 718). Accordingly, the time unit 93 associated with the highest correlation value is deemed to represent the distance that the tag 102 was from the base unit 110. In other words, the tag 102 was 12.6 feet away from the base unit 110 (i.e., 93 relative time units multiplied by 1.631 inches per time unit yields approximately 12.6 feet).

For circumstances in which the example area 101 includes a room having substantial echo, a highest correlation value may not necessarily represent a match between the base waveform 750 and the tag waveform 752. In the illustrated example of FIG. 8, an example list of correlation values 800 has a time unit column 802 and a correlation value column 804 and spans from time unit 80 through time unit 180. As described above, time unit 93 illustrates a local maximum correlation value of 0.352820, which is indicative of a match between audio data from the base unit waveform 750 and the tag waveform 752. However, in the event that the example tag 102 collects audio signal data for a duration of, for example, five (5) seconds, then one or more echoes may occur in the example area 101. In particular, time unit 168 of the example list of correlation values 800 illustrates a local maximum correlation value of 0.368839. In the event that the example area 101 is a room of twelve by twelve feet, then the local maximum at time unit 168 is an unrealistic indication of a match because it corresponds to approximately 22.4 feet. Accordingly, the local maximum correlation value at time unit 168 is likely the result of an echo.

To combat and/or eliminate false positives as described above, the methods, systems, apparatus and articles of manufacture described herein may employ a threshold value limit of acceptable time units in which to identify a local maximum correlation value. Threshold values for time units may be established based on advanced knowledge of one or more example area(s) 101 in which the tag 102 may operate. For circumstances where the tag(s) 102 will be used in relatively small rooms, such as 10'×10' rooms, threshold values for the time unit may be set at or around 74 time units. On the other hand, for circumstances where the tag(s) 102 will be used in larger rooms, such as 15'×15' rooms, threshold values for the time unit may be set at or around 110 time units.

In other examples, the example methods, systems, apparatus and articles of manufacture described herein identify and/or eliminating false positives caused by echo phenomenon by disqualifying correlation peaks at a later time regardless of the duration of such peaks and/or the magnitude of the correlation value at such peaks. For example, echo suppression may occur by way of evaluating correlation value results in a sequential manner from a closest distance to a farthest distance of interest. In the event of a first local maximum correlation peak at a first time (i.e., the first time corresponds to a highest correlation value when compared to all prior times), the first time is deemed to be the desired maximum if it remains higher than N time samples following thereafter (e.g., for 30, 50 and/or 100 time samples, where each time sample is 1/8000 seconds). As such, even if a higher correlation value is detected at a later time (e.g., farther away), such later higher correlation values are deemed to be associated with one or more echo phenomena and ignored. In other words, all other peaks that may occur at a later time are, in effect, locked out from consideration. For instance, if another distance estimate exhibits a second local maximum correlation value having a higher magnitude, the second local maximum correlation value is not deemed to be a valid match of waveforms (750, 752) because it was locked out based on the first local maximum. A sufficient number of time samples N may be determined and/or otherwise established in any manner, including empirical tuning. For example, values of N may include, but are not limited to 30, 50 and 100, which correspond to distance values of 4 feet, 7 feet and 14 feet, respectively when considering a speed of sound at 741 miles per hour.

The example system 100 may also accommodate different types of microphones employed by the tags 102A, 102B and/or base unit 110. Example microphones may exhibit and/or be constructed with a particular polar pattern, thereby affecting directional sensitivity to sound. For example, unidirectional polar pattern microphones excel at capturing sounds from a relatively narrow degree range, while omnidirectional polar pattern microphones respond to a relatively wider degree of incident sound energy. Based on the type of microphone(s) employed by the example tags 102A, 102B and/or the example base unit 110, decimation rate(s), scaling threshold(s) and/or correlation value threshold(s) may be adjusted accordingly.

The example tag distance calculation system 100 may also be used to identify participant presence within a room for circumstances in which distance calculations are not needed. As described above, higher correlation values represent greater similarity between captured tag 102 audio and base unit 110 audio signals. Threshold correlation values may be empirically determined for one or more example area(s) 101 to indicate whether a tag (and its wearer) are present within the example area(s) 101 by virtue of the magnitude of the correlation value.

The example tag distance calculation system 100 may also be used to distinguish audience member exposure from audience member consumption. Generally speaking, audience member exposure to media content indicates that the audience member was proximate to the media content, but not necessarily engaged in listening and/or watching the media content. Audience member consumption, on the other hand, reflects media content with which the audience member is engaged and/or to which the audience member is paying attention.

Figure 9:
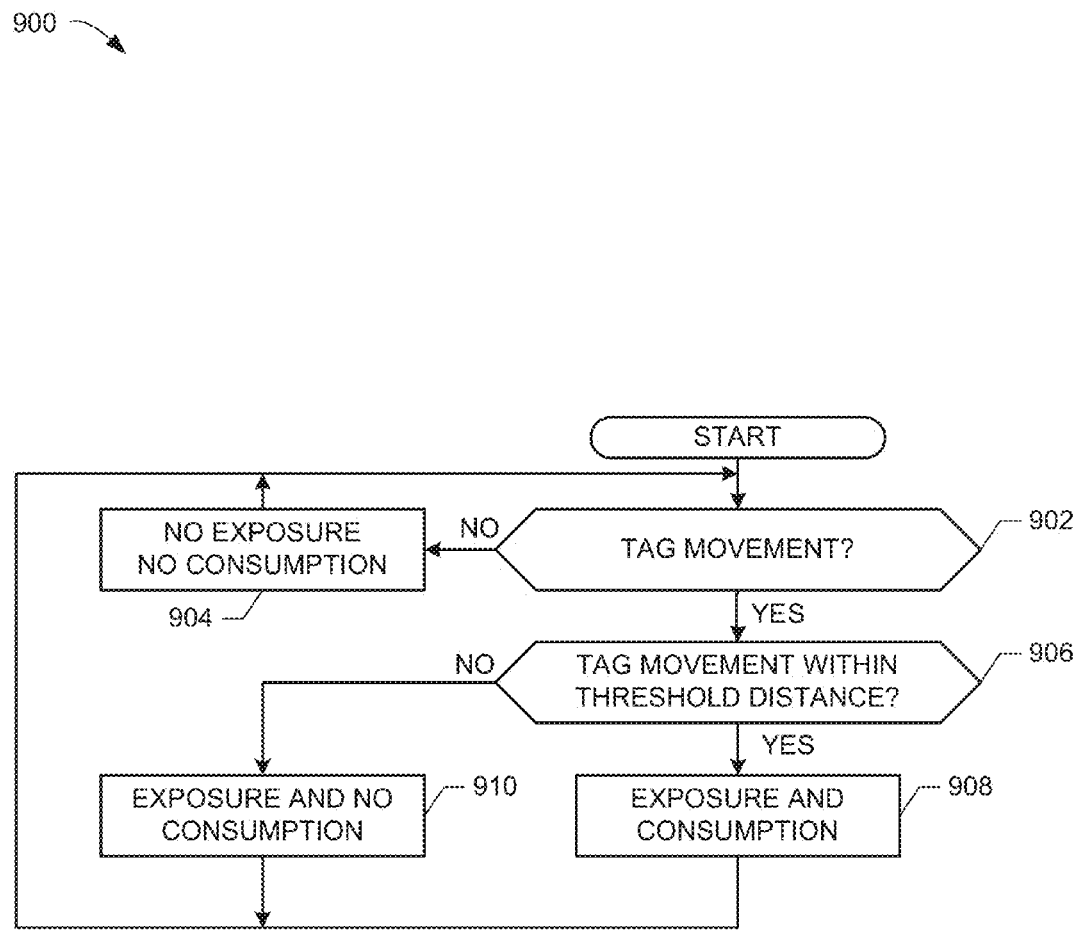

The example process 900 of FIG. 9 begins with the base unit 110 analyzing collected and processed tag 102A, 102B data and base unit audio data for an indication of whether the tag 102A, 102B has moved (block 902). If not, then the base unit 110 and/or system 100 may determine that there has been no exposure and/or consumption of media content that is emitted by the example media delivery center 106 via the example speaker 108 (block 904). On the other hand, in the event that the base unit 110 analyzes the collected and processed tag 102A, 102B data and base unit data to determine tag movement has occurred (block 902), then the base unit 110 may further compare the magnitude of the tag 102A, 102B movement with one or more threshold values (block 906). For example, movement within three (3) to seven (7) feet may be indicative of an audience member that is exploring a museum from room to room and dwelling for a period of time to engage with an informational kiosk and/or a presenter. In such example scenarios, the example base unit 110 may determine that exposure and consumption of media content has occurred (block 908). On the other hand, in the event that an audience member exhibits substantial movement within an example area 101, such as a waiting queue for an amusement park ride, then the example base unit 110 may determine that exposure (e.g., to an overhead television) has occurred, but consumption of such media has not occurred (block 910).

As described above, some applications related to audience member monitoring attempt to synchronize an action between the tag and the base unit, such as the example tags 102A, 102B and the example base unit 110 of FIGS. 1-3. For example, if a tag emits an RF initialization chirp at random and/or periodic times in an effort to initiate a data collection action with a nearby base unit, then the tag may wait for an acknowledgement response signal/packet (an ACK signal/packet). In some examples, the ACK packet contains identifying information related to the base unit and payload information to be processed by the example tags 102A, 102B. Once the tag determines that a base unit is within communication distance, the tag and base unit attempt to capture audio information of the environment at the same time. The audio information collected from the tag is matched to the audio information collected from the base unit as a matching pair, and may further be analyzed at a later time (e.g., by the central facility 112) to determine where the user associated with the tag was located, the distance between the tag and the base unit, and/or identification of the media collected by the tag and/or base unit (e.g., audio signature analysis, audio code(s) detection, etc.). Such post-collection analysis presents matching accuracy issues when the samples collected by the tag differ from the samples collected by the base unit. In particular, post-collection analysis may be difficult when the duration of the collected audio information by the base unit differs from the duration of the collected audio information by the tag. For the examples that follow, the example tag 102A is employed for purposes of discussion rather than limitation. In other words, the example tag 102B and/or one or more additional/alternate tags may be employed with the methods, systems, articles of manufacture and apparatus described herein.

Figure 10:
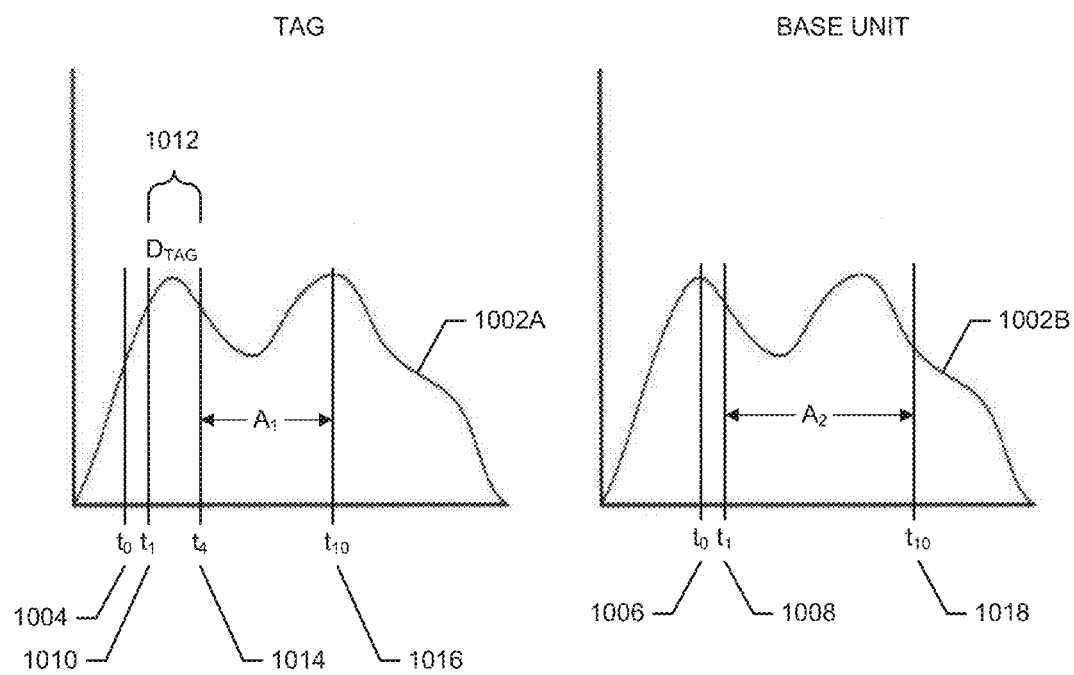
FIGS. 10 and 13 are example audio waveforms received by the tag(s) of FIGS. 1 and 2, and example audio waveforms received by the base unit of FIGS. 1 and 3.

FIG. 10 includes an audio waveform 1002A received by the example tag 102A and the same audio waveform 1002B received by the base unit 110 to illustrate the discrepancies between the information (e.g., data samples saved to a memory) collected by the tag 102A, 102B and the information collected by the base unit 110. The example audio waveform 1002A, 1002B is, for example, a portion of audio energy emitted by the speaker 108 located near the example base unit 110 and tag 102A. More specifically, discrepancies between the tag 102A, 102B and the base unit 110 occur when actions (e.g., start recording, stop recording) therebetween are not synchronized in time. In the illustrated example of FIG. 10, the tag 102A transmits an RF initialization packet (or packet) at time $t_0$ 1004 to determine if any base units are nearby. The base unit 110 receives the RF initialization packet at time $t_0$ (1006) because, for all practical purposes, the propagation speed of the RF initialization packet from the tag 102A to the base unit 110 is instantaneous. However, because the example base unit 110 is located very near to the source of audio, the waveform is shifted, which is represented by time markers (e.g., $t_0$, $t_1$, $t_2$, etc.) of the waveform 1002B appearing farther to the right when compared to the time markers of the waveform 1002A. To let the tag 102A, 102B know that the base unit 110 is within communication range, the base unit 110 transmits an ACK packet at time $t_1$ 1008, which is received by the tag at time $t_1$ 1010.

After the tag receives the ACK packet at time $t_1$ 1010, which may contain payload information of varying lengths (e.g., information to identify the base unit), the tag 102A, 102B begins collecting audio samples after a tag delay period of time $D_{TAG}$ 1012. The delay period of time $D_{TAG}$ 1012 may be caused by the tag circuitry (e.g., tag processor 202) processing the received ACK packet. In other examples, $D_{TAG}$ 1012 is caused by a program counter position of the tag processor 202. In other words, $D_{TAG}$ 1012 may vary based on a number of factors such that the time at which the example tag actually starts recording audio (e.g., at time $t_4$) 1014 is not predictable.

Although the base unit 110 sends the ACK packet 1008 at time $t_1$ to trigger the beginning of audio data collection, the example tag 102A does not begin audio data collection until time $t_4$ due to tag processing delays $D_{TAG}$ 1012. As such, the example base unit 110 collects a portion of the audio waveform 1002B starting at time $t_1$ (1008) while the example tag 102A collects a portion of the audio waveform 1002A starting at time $t_4$ (1014). As described above, future attempts to match the collected data samples between the tag 102A and the base unit 110 may be complicated in view of the dissimilar starting times and/or differences in the overall duration of the collected audio between the base unit 102A and the base unit 110.

In the illustrated example of FIG. 10, the tag 102A transmits an RF signal or packet (e.g., a packet including information identifying the tag 102A) to stop recording audio 1016 (at time $t_{10}$), which also causes the base unit 110 to stop recording audio 1018 (at time $t_{10}$). The example tag 102A, 102B recorded audio data for six (6) time units (i.e., $t_4$ through $t_{10}$), which is represented by duration $A_1$. On the other hand, the example base unit 110 recorded audio data for nine (9) time units (i.e., $t_1$ through $t_{10}$), which is represented by duration $A_2$. Attempts to later match durations $A_1$ and $A_2$ are, thus, complicated because the duration of $A_1$ does not equal the duration of $A_2$, and because the example tag 102A and the example base unit 110 do not begin recording at the same time. In the event that the example tag 102A stores a number of audio recordings (e.g., storing audio until a buffer storage threshold is reached), the receiving base unit 110 and/or the example entral facility 112 needs to identify a match between audio recordings captured and stored by the tag(s) and audio recordings captured by the base unit(s). Attempts to determine which instances of collected tag audio occurred at the same time as instances of collected base unit audio become difficult if the tag(s) batch their stored instances of audio information. In such cases, a match may need to occur between numerous tag(s) and number base unit(s) at numerous dates/times.

In some examples, the tag(s) employs a real time clock to date/time stamp audio information at the time it is collected and stored to allow each instance of stored tag audio information to be stored with each instance of stored base unit audio information. Additionally, the tag(s) embed tag identification information in the collected audio information. In such cases, the tag(s) must consume additional power to embed and transmit extra data via RF signals to the base unit(s). Further, the real time clock consumes additional power from the tag, which reduces an amount of time it can operate in the field prior to a recharge.

As described in further detail below, the example base unit 110 may attempt to match collected data samples with data samples collected by one or more tags. Rather than attempt to match tag data samples with base unit audio samples by examining analog or digital waveform characteristics (e.g., corresponding audio energy peaks, audio energy lows, etc.), the example base unit 110 may determine a match based on a similar or identical duration of the collected data samples. For example, if the base unit 110 collects 2000 milliseconds of data samples and receives data samples from two tags, one having 2000 milliseconds of duration and the other having 2020 milliseconds of duration, then the base unit can identify a match between its collected data samples and those from the tag having 2000 milliseconds of duration.

Figure 11:
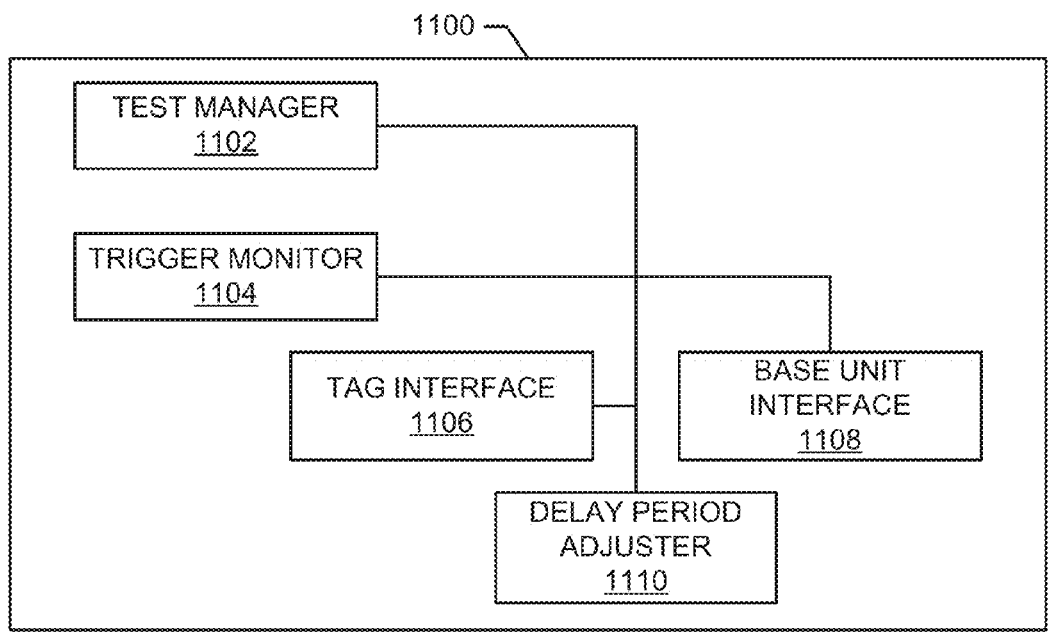
FIG. 11 is a schematic illustration of an example calibrator for use in the system of FIG. 1.

FIG. 11 is a block diagram of an example calibrator 1100 that may be used with the example base unit 110 and example tags 102A, 102B of FIGS. 1-3. In the illustrated example of FIG. 11, the calibrator 1100 includes a test manager 1102, a trigger monitor 1104, a tag interface 1106, a base unit interface 1108, and a delay period adjustor 1110. In operation, the example test manager 1102 verifies that a tag to be calibrated is communicatively connected to the example trigger monitor 1104 via the example tag interface 1106. Additionally, the example test manager 1102 verifies that a base unit to be calibrated with the tag is communicatively connected to the example trigger monitor 1104 via the example base unit interface 1108. Communicative connection between the trigger monitor 1104 and the tag and/or the base unit, such as the example tag 102A, 102B of FIG. 2 and the example base unit 110 of FIG. 3, may include, but is not limited to connection of trigger monitor probes to circuit points of the example tag 102A, 102B and base unit 110. The example trigger monitor 1104, in operation, monitors one or more of the example tag 102A, 102B and base unit 110 for one or more trigger actions occurring thereon. For example, the trigger monitor 1104 may be an oscilloscope, a logic analyzer or similar device capable of identifying circuit logic state(s), voltage fluctuation (s) and/or other electrical and/or physical phenomena. Circuit points of the example tags and/or base unit(s) may include one or more pins of the example processor 202 of the tag 102A, 102B and/or one or more pins of the example processor 302 of the base unit 110.

Additionally or alternatively, the example test manager 1102 may be communicatively connected to the tag 102A, 102B and/or base unit 110 to determine whether a device is responsive and/or ready to execute additional process(es) and/or facilitate function(s). As described above, a program counter of a processor may be in any number of locations during program execution. In some examples, the program counter may be in a location that allows the device (e.g., the tag 102A, 102B) to be responsive to processing request(s), while in other examples the program counter may be in a location that requires a number of clock cycles before additional processing request(s) can be serviced. For example, if the tag 102A receives an RF ACK packet from the base unit, the program counter may be positioned such that audio recording may begin relatively soon after the arrival of the RF ACK packet at one or more pins of the processor 202. However, in other examples the receipt of the RF ACK packet by one or more pins of the processor 202 may not be processed for a greater number of clock cycles because one or more other operation(s) are being processed by the processor 202. Such uncertainty regarding when the tag 102A is capable and/or otherwise ready to perform frustrates attempts to synchronize actions (e.g., starting a record operation, stopping a record operation, etc.) between the tag 102A and other devices. In other examples, the trigger monitor 1104 may monitor the processor of the tag 102A to determine an activity state. Activity states of a processor may be determined by a logical value of a processor pin (e.g., "true," "false," "1," "0," etc.), which are indicative of a processor that is busy with a current task(s) or available to accept additional task(s).

In operation, the example calibrator 1100 instructs the tag 102A to send an RF packet to the base unit 110. The example trigger monitor 1104 may confirm that one or more portions of the tag 102A circuitry (e.g., one or more pins of the processor 202) caused the RF packet to be sent. The example trigger monitor 1104 may also confirm when the example base unit 110 receives the RF packet by monitoring one or more pins of the base unit 110 circuitry. When the base unit 110 receives the RF packet, the example test manager 1102 may initiate a trigger measurement pulse at a first moment in time. The example base unit 110 sends an acknowledgement (ACK) RF packet back to the tag 102A to inform the tag 102A that it is nearby and/or within communication distance. As described above, the RF ACK packet may include payload information to be received and/or processed by the receiving mobile unit, such as the receiving example tag 102A. Payload information may include, but is not limited to base unit identification information, time/date information, media identification information, etc.

When the example trigger monitor 1104 confirms that the tag 102A has received the RF ACK packet, the tag 102A waits for a delay period (B'). At least one purpose of the delay period B' is to allow the tag 102A to complete processing of the received RF ACK packet before initiating an action, such as an action to begin recording audio. For example, the received RF ACK packet may have a payload of information therein that is parsed by the tag 102A. Payload information may include, but is not limited to information related to an identity of the base unit 110, time and date information, base unit 110 operating characteristics, etc. The delay period B' may be generated by the example delay period adjuster 1110 and, when B' expires, the example test manager 1102 initiates another trigger measurement pulse at a second moment in time. As described in further detail below, the elapsed time between the first moment in time and the second moment in time may be used to adjust the delay period B'.

In the illustrated example of FIG. 11, the test manager 1102 determines whether the tag 102A is ready to process one or more actions after B' expires. To determine whether the example tag 102A is ready to process one or more actions, the example test manager 1102 monitors the processor 202 of the tag 102A. In some examples, the test manager 1102 invokes one or more functions of the processor 202 to determine whether it can respond to a request immediately, or whether it places the request(s) in a queue/buffer. In other examples, the trigger monitor 1104 monitors one or more portions of the tag 102A circuit (e.g., one or more pins of the processor 202) to determine if the processor is finished processing the received RF ACK packet.

If the test manager 1102 determines that the tag 102A is not responsive, or that the tag 102A requires additional time before it becomes responsive, then the example delay period adjuster 1110 increases the value for B' based on the elapsed time between the first moment in time and the second moment in time. A larger duration for B' allows, in part, the tag 102A to complete its processing of the received RF ACK packet. The example calibrator 1100 invokes another iteration of testing the tag 102A and the base unit 110 to determine whether or not the larger duration setting for B' is sufficient based on responsiveness of the tag 102A after receiving the RF ACK packet. In other examples, the test manager 1102 may identify an upper bound value for B' by increasing a packet length transmitted by the base unit 110 and received by the example tag 102A. When an upper bound value for B' is identified by the example test manager 1102, the value for B' may be set for all base units and tags to be used in a monitoring environment, such as the example area 101 of the tag distance calculation system 100 of FIG. 1.

Figure 12:
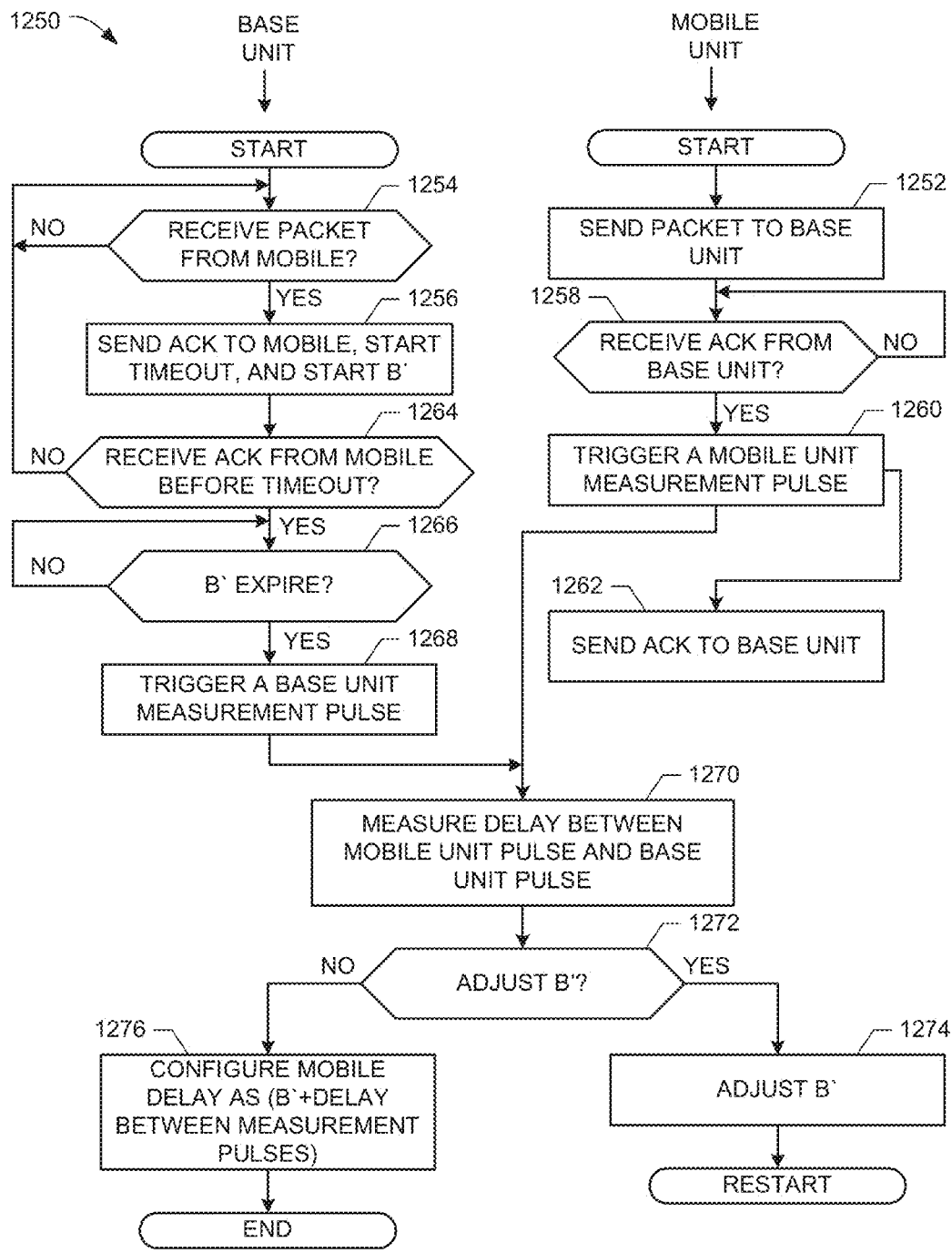

The example process 1250 of FIG. 12 illustrates operation of the test manager 1102 when calibrating the tags (mobile units) and base units to be used for audience measurement. In the illustrated example of FIG. 12, operation of the base unit 110 (left side) and the tag 102A (right side) are shown in temporal relation to each other during calibration. The example test manager 1102 invokes the tag 102A that is communicatively connected to the tag interface 1106 to send an RF packet to the base unit 110 (block 1252), such as an RF initialization packet. The example base unit 110 is communicatively connected to the base unit interface 1108, which is monitored by the example test manager 1102 to determine whether the base unit 110 has received the RF packet (block 1254). The example test manager 1102 may employ the trigger monitor 1104 to monitor base unit 110 circuitry for an indication that the RF packet was received and/or processed by the base unit 110. If the RF packet is not received by the base unit (block 1254), the example test manager 1102 continues to wait, otherwise the test manager 1102 sends an ACK packet to the tag 102, starts a base unit timeout timer, and starts a timer set to a value for the delay period B' (block 1256). If the tag 102A does not receive the ACK from the base unit (block 1258), then the tag 102A waits for receipt of the ACK, otherwise the example tag 102A triggers a mobile unit measurement pulse (block 1260). As described in further detail below, the mobile unit measurement pulse is used to calculate a delay value between the example tag 102A and the example base unit 110. The example tag 102A also sends an ACK packet back to the base unit (block 1262).

If the example base unit 110 does not receive the ACK packet from the mobile unit prior to expiration of the base unit timeout timer (block 1264), then the example process 1250 restarts. However, if the base unit 110 receives the ACK packet from the tag 102A before the base unit timeout period expires (block 1264), then the base unit waits for the delay period B' to expire (block 1266). When the delay period B' expires (block 1266), the base unit triggers a base unit measurement pulse (block 1268), and the delay period adjuster 1100 measures a delay value between the mobile unit measurement pulse and the base unit measurement pulse (block 1270).

The example delay period adjuster 1110 determines whether the value of B' is too low or too high and, if so, adjusts the value of B' (block 1272). For example, if the value of B' is too low, then it is possible that the base unit performs one or more actions before the example tag 102A is ready to operate. In other words, if B' is too low, then the base unit 110 operates prior to the tag 102A returning the ACK packet back to the base unit (block 1262), which indicates that a larger value of B' is needed (block 1272). As described above, the example tag 102A may not be as responsive as the base unit 110 because, for example, the tag 102A processor requires more time to process RF signal(s) received by the base unit 110. In other examples, the tag 102A processor 202 may have its program counter in a position such that additional time is required before the processor 202 can process one or more additional request(s). In such cases where the example tag 102A requires additional time to respond, the example delay period adjuster 1110 adjusts B' to a larger value and the example process 1250 restarts. When adjusting B' to a larger value, the example delay period adjuster 1110 may increase the value of B' based on a percentage, a finite incremental value, a predetermined amount of time (e.g., adding 5 milliseconds), etc. Any other manner of determining the increase of the B' delay value may be implemented, without limitation.

In other examples, the value of B' may be too large, which causes the example tag 102A and the example base unit 110 to wait unnecessarily. For instance, if the delay between the base unit measurement pulse (block 1268) and the mobile unit measurement pulse (block 1260) exceeds a threshold value (e.g., 200 milliseconds), then the value of B' may be reduced by a percentage, a finite incremental value, etc. Determining whether the value of B' is too large may be accomplished in a number of ways such as, but not limited to, adjusting the value of B' in an iterative manner until the base unit operates before the example tag 102A has an opportunity to transmit its ACK packet back to the base unit (block 1262). In such circumstances, the iterative reduction of the value of B' allows the example delay period adjuster 1110 to approach and determine a lower level value that should not be crossed. To allow the example tag 102A and example base unit 110 to operate without concern for the value of B' being too low, the example delay period adjuster 1110 may use the identified lower level value and multiply it by a safety constant. For instance, if the lower level value of B' is determined to be 75 milliseconds before the tag 102A exhibits an ability to "keep up," then the example delay period adjuster 1110 may multiply 75 by a safety constant of 1.5 to establish a value of 112.5 milliseconds for B'.

On the other hand, if the example delay period adjuster 1110 determines that there is no need to adjust B' (block 1272), then the example tag 102A is configured to operate with a tag delay equal to B' plus the difference between the base unit measurement pulse (block 1268) and the mobile unit measurement pulse (block 1260) (block 1276). In effect, the delay value B' is initiated by the example base unit 110 during operation and allows the tag 102A to "catch up" before triggering an action when B' expires.

Figure 13:
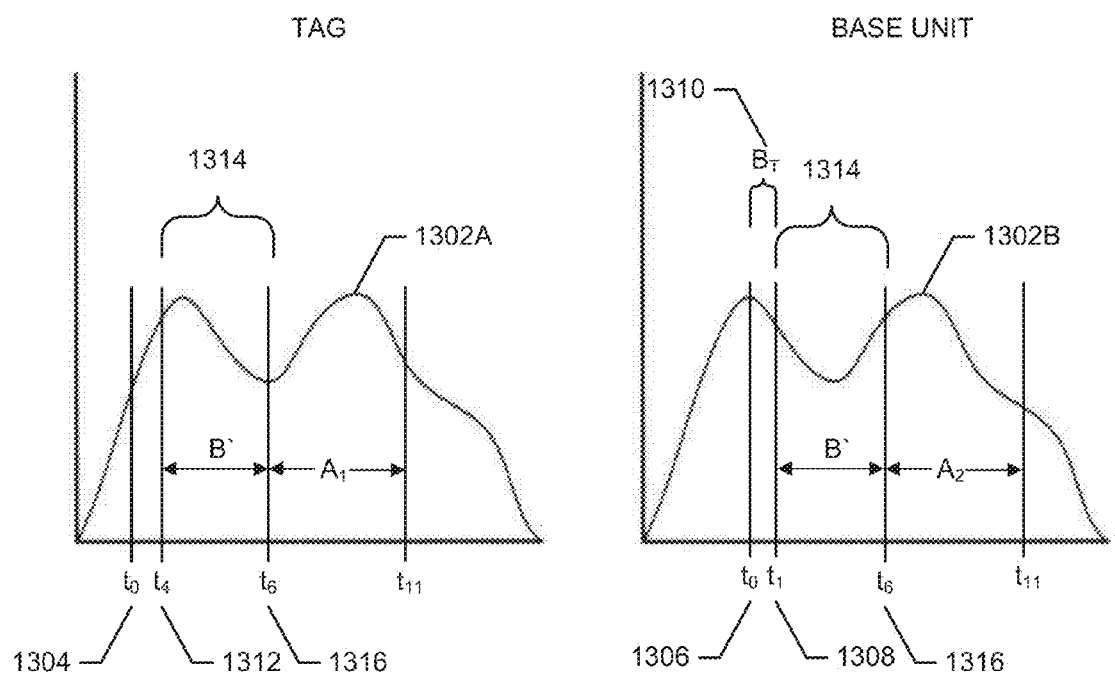

FIG. 13 includes an example audio waveform 1302A received by the example tag 102A and the same audio waveform 1302B received by the example base unit 110 to illustrate operation of the tag 102A and base unit 110 in a monitoring environment after one or more calibration process(es) 1250 have occurred. The example audio waveform 1302A, 1302B is, for example, a portion of audio emitted by a speaker located near the example base unit 110. As described above, the example tag 102A and the example base unit 110 have been set with a delay period value B' for use during operation in a monitoring environment. In the illustrated example of FIG. 13, the tag 102A transmits an RF initialization packet at time $t_0$ 1304 in an effort to determine if any base units are nearby. The base unit 110 receives the RF initialization packet at time $t_0$ 1306 because, for all practical purposes, the propagation speed of the RF initialization packet from the tag 102A to the base unit 110 is instantaneous. Similar to the example audio waveform 1002A, 1002B of FIG. 10, because the example base unit 110 is located next to the source of audio, the waveform is shifted, which is represented by time markers (e.g., $t_0$, $t_1$, $t_2$, etc.) of the waveform 1302B appearing farther to the right when compared to the time markers of the waveform 1302A. To let the tag know that the base unit is within communication range, the base unit 110 transmits an RF ACK packet at time $t_4$ 1308, after waiting for a random amount of time $B_r$ (1310). The random amount of time $B_r$ may be implemented to minimize the occurrence of crosstalk and/or communication interference when more than one tag and/or base unit are proximate to each other. The ACK packet (at time $t_4$) is received by the tag at time $t_4$ 1312, at which point both the tag 102A and the base unit 110 wait for the previously calibrated delay time B' 1314.

As described above, the delay time B' is selected and/or otherwise calculated to, in part, allow the example tag 102A to complete its processing of the received RF ACK packet prior to initiating an action, such as beginning to record audio information in the monitored area (e.g., the example area 101 of FIG. 1). In other words, rather than attempt to force the example tag 102A to immediately begin collecting audio data after receiving the RF ACK packet (1312), which may not be possible because the tag 102A is still processing the received ACK packet, the tag 102A and the base unit 110 both wait for B' to expire. As such, the example tag 102A and the example base unit 110 may begin a corresponding action at the same time $t_6$ (1316).

In the illustrated example of FIG. 13, the delay time B' 1314 expires at time $t_6$ for both the tag 102A and the base unit 110. When the example tag 102A determines that collection of audio, $A_1$, is complete at time $t_{11}$, it transmits a stop RF packet to the base unit 110. The example base unit 110 receives the stop RF packet at time $t_{11}$ and marks $t_{11}$ as the time to stop collecting audio (or any other action). Accordingly, both the example tag 102A and the example base unit 110 collect audio data for periods $A_1$ and $A_2$, respectively. In other words, time period $A_1$ of the example tag 102A occurs between time $t_6$ and $t_{11}$, and time period $A_2$ of the example base unit 110 occurs between time $t_6$ and $t_{11}$. Unlike the example tag 102A and the example base unit 110 of FIG. 10, in which periods $A_1$ and $A_2$ were not equal and did not start at the same time, the periods $A_1$ and $A_2$ of FIG. 13 collect audio information for the same duration of time and start at the same moment in time. At least one benefit of facilitating equal action times between the base unit 110 and the tag 102A is that a cursory/preliminary matching may occur without detailed analysis of the contents of the collected data samples saved to memories of the base unit 110 and/or tag 102A. For example, prior techniques to identify a match between tag 102A data samples with base unit 110 data samples included the use of a real time clock (RTC) on the tag 102A to time and date stamp each collected sample. To identify a match between the base unit 110 and the tag 102A, the base unit or other evaluation equipment was required to parse the data samples to search for matching time stamp information created by the RTC of the tag 102A. However, the methods, systems, articles of manufacture and apparatus described herein allow a match to occur between the collected data samples of the base unit 110 and tag 102A based on an envelope duration of the collected data samples, thereby avoiding additional processing resources required to examine and/or otherwise process the contents of the collected data samples.

Figure 14:
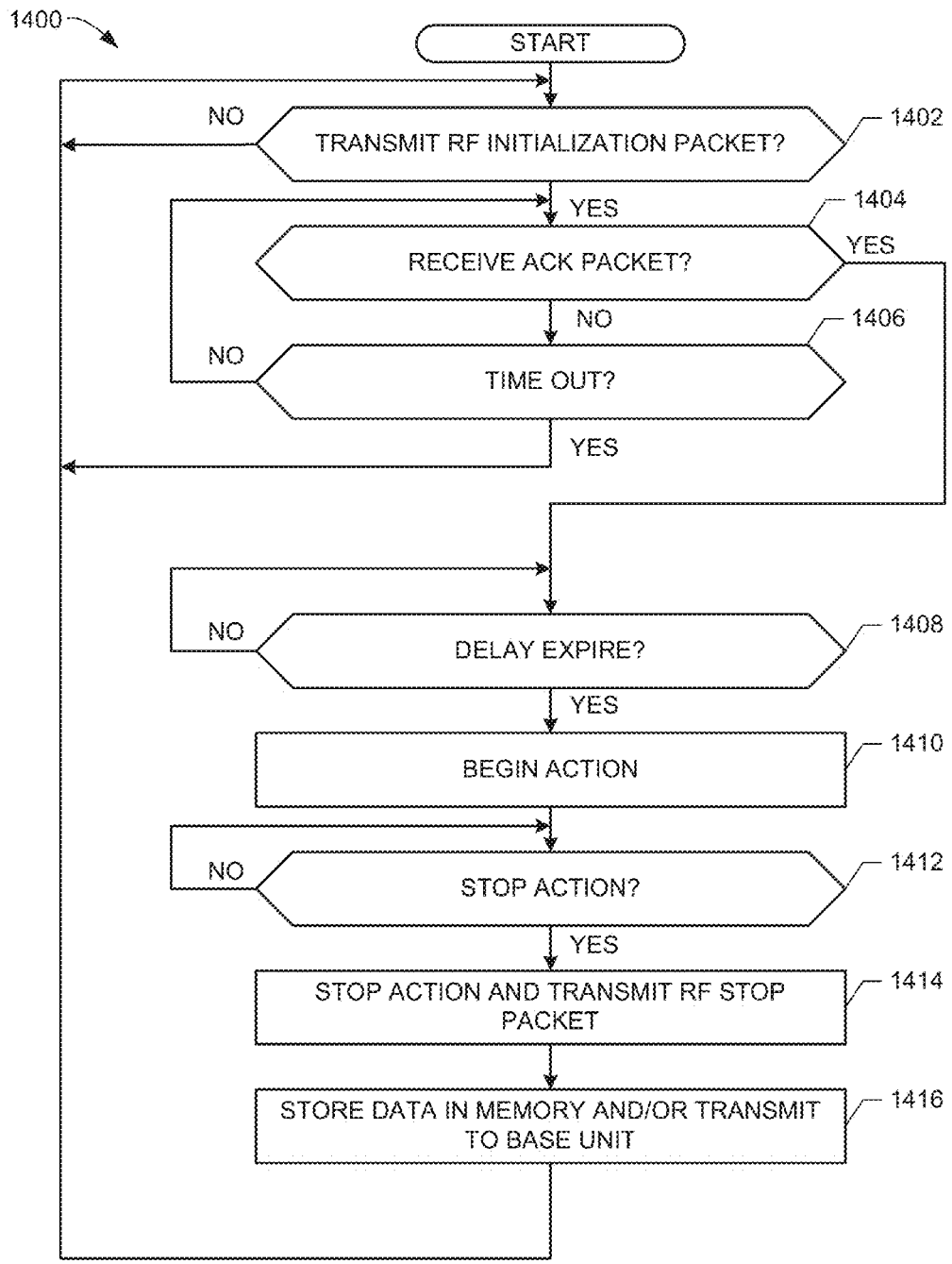

The example process 1400 of FIG. 14 illustrates operation of a mobile unit, such as the example tag 102A after it has been calibrated with one or more base units, such as the example base unit 110. In the illustrated example of FIG. 14, the processor 202 invokes the RF transmitter 210 to transmit an RF initialization packet on a periodic, aperiodic, scheduled and/or manual basis (block 1402). In response to transmitting the RF initialization packet, the RF transmitter 210, which may operate as a transceiver capable of both RF transmission and reception, waits for receipt of an acknowledgement (ACK) packet from a base unit 110 in communication proximity to the tag 102A (block 1404). If no RF ACK packet is received (block 1404), the example timer/counter 206 determines whether a time out period has expired (block 1406). If the time out period has not expired (block 1406), then the RF transmitter 210, as monitored by the processor 202, continues to monitor for the RF ACK packet (block 1404). However, if the time out period expires (block 1406), then the tag 102A may not be within communication distance of one or more base units and the example process 1400 returns to block 1402.

In the event that the RF ACK packet is received (block 1404), then the timer/counter 206 determines whether the delay calculated during the calibration (see FIG. 12) has expired (block 1408). As described above, the calibrated delay is based on the value of B' plus the amount of time between the mobile unit measurement pulse (block 1260) and the base unit measurement pulse (block 1268). The example tag 102A waits until the delay period B' expires and, when it does (block 1408), one or more actions begin (block 1410). As described above, the delay period B' for the example tag 102A is calibrated to be the same as the delay period B' for the base unit 110, both of which are initiated by the transmission/receipt of the RF ACK packet. Accordingly, the base unit 110 is also performing its corresponding action at the same start time. When the example tag 102A determines it is time to stop the action (block 1412), the processor 202 stops the action (e.g., collection of audio in the monitored environment) and transmits an RF stop packet (block 1414). The processor 202 stores any collected data in the memory 204 (block 1416) and the example process 1400 returns to block 1402. In some examples, the processor 202 causes the collected data stored in the memory 204 to be transmitted with the RF stop packet, shortly thereafter, or before the next instance where the tag 102A collects audio. As such, memory storage requirements of the example tag 102A are reduced and, in some examples, the memory 204 used by the tag 102A may be less expensive.

To allow collected data samples of one tag (e.g., tag 102A) to be distinguished from collected data samples of another tag (e.g., tag 102B), each tag may be configured to perform its action for a period of time that differs from all other tags. For example, tag 102A may perform an action (e.g., collecting audio data) for 2000 milliseconds, while tag 102B may perform its action for 2020 milliseconds. The base unit 110 that collects two instances of data samples can associate a match between such collected data samples based on matching the action duration, thereby avoiding resource intensive signal processing activities.

Figure 15A:
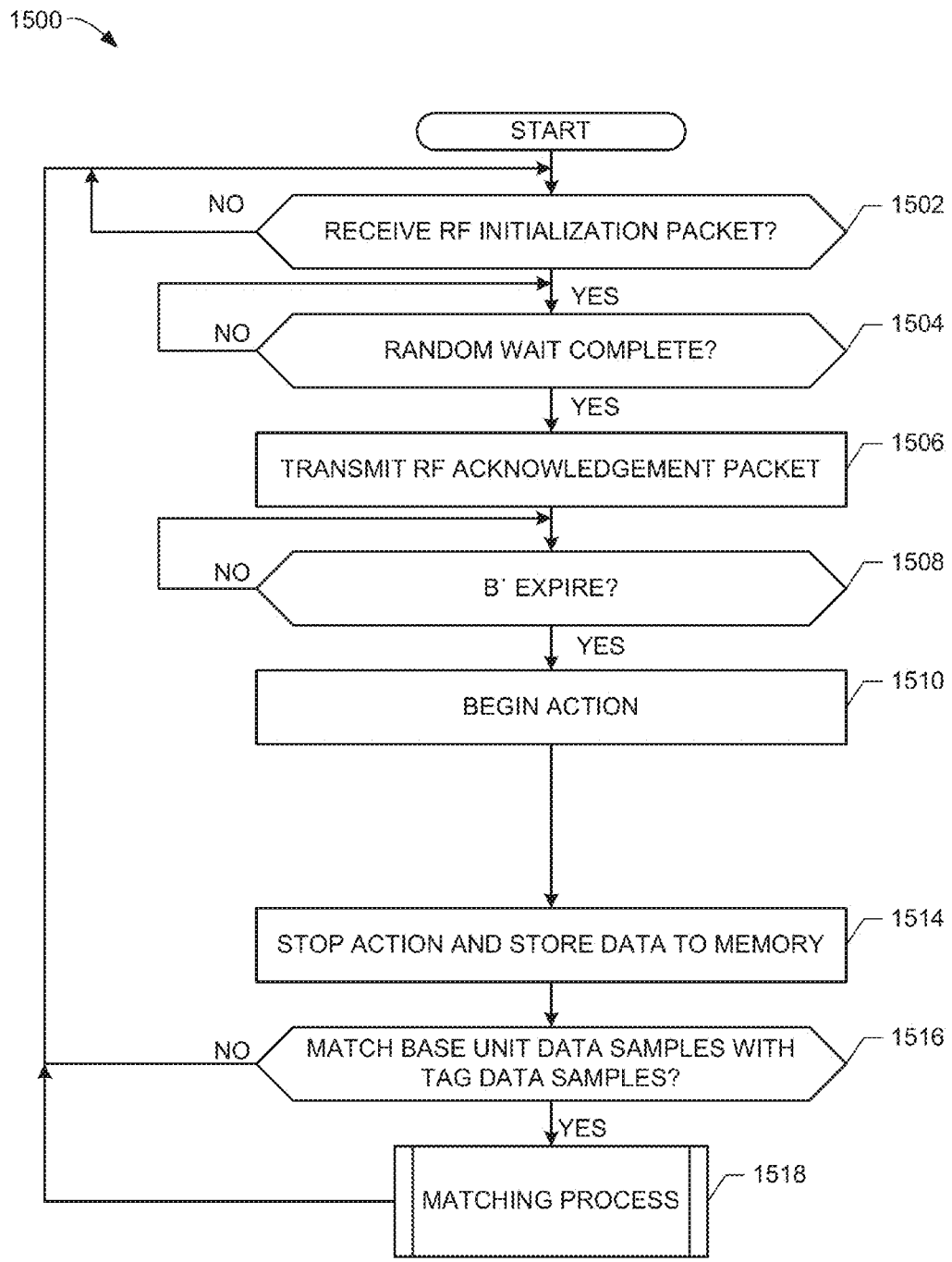

The example process 1500 of FIG. 15A illustrates operation of a base unit, such as the example base unit 110 after it has been calibrated to employ a delay time B' with one or more mobile units, such as the example tag 102A. In the illustrated example of FIG. 15A, the processor 302 invokes the RF interface 308 to determine whether an RF initialization packet has been received (block 1502). If no RF initialization packet is received, the example process 1500 continues to wait (block 1502), otherwise the example processor 302 determines whether a random waiting period is complete (block 1504). As described above, the random waiting period may minimize the crosstalk and/or communication interruption(s) when more than one tag and/or base unit attempts to communicate in a monitored area.

When the random waiting period expires (block 1504), the example processor 302 invokes the RF interface 308 to transmit an RF ACK packet (block 1506), which triggers the beginning of the delay period B' established by the prior calibration. When the example processor 302 determines that the delay period B' has expired (block 1508), the processor 302 invokes the action (block 1510). As described above, the example action may include, but is not limited to initiating an audio data collection of a monitored area of interest. The example processor 302 collects a predetermined quantity of data before stopping the action and storing collected audio data to a memory as data samples (block 1514). In some examples, the example processor may monitor the example RF interface 308 for receipt of an RF stop packet, which may be transmitted by a mobile device, such as the tag 102A, to signal an end to the action. As described above, each mobile device may be configured to perform an action for an amount of time that is different from any other mobile device to facilitate matching between collected data samples of the mobile device(s) and base unit. For example, if the base unit detects (and saves) a first set of audio samples for 2000 milliseconds and a second set of audio samples for 2020 milliseconds, and receives a first RF transmission of data samples having a duration of 2000 milliseconds and a second RF transmission of data samples having a duration of 2020 milliseconds, then the base unit 110 may identify similar or identical durations as matching. When the RF stop packet is received (block 1512), the example processor 302 of the base unit 110 causes the action to stop and stores any saved data to the memory 304 (block 1514). If the example base unit 110 is not ready and/or otherwise configured to perform a matching process between collected data samples and data samples received from tag(s) via RF transmission(s) (block 1516), then control returns to block 1502. However, if the example base unit 110 is to perform the matching process (block 1516), then a matching process is initiated (block 1518).

Figure 15B:
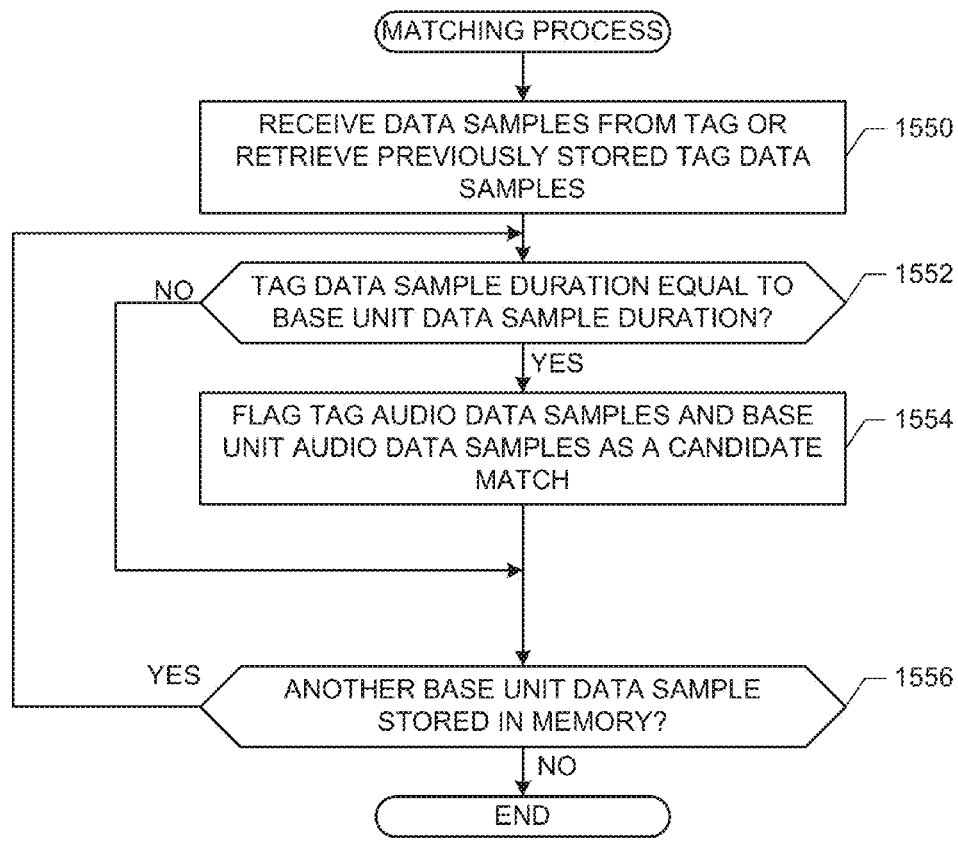

The example process 1518 of FIG. 15B illustrates a matching process performed by the base unit 110 after receiving one or more RF transmissions of data samples from one or more tags. In the illustrated example of FIG. 15B, the base unit 110 receives an RF transmission containing data samples from a tag or retrieves previously received data samples from the tag (block 1550). During operation, the example base unit 110 may operate for a period of time while collecting and storing audio samples, and receiving RF transmissions of data samples from one or more tags in one or more example areas, such as the example area 101 of FIG. 1. As such, the example base unit 110 may have one or more sets of data samples received from tags stored in the memory 304 and one or more sets of data samples stored from the base unit's 110 storage of audio samples. Each tag operating in the example area 101, such as the example tags 102A and 102B, may be configured to perform its action (e.g., recording audio samples) for a predetermined amount of time. When each tag performs its action for a predetermined amount of time that differs from any other tag, the base unit 110 may more easily match its collected data samples with a corresponding set of data samples from a tag having the same duration (e.g., 2000 milliseconds).

The example base unit 110 determines whether the tag data sample duration is equal to a base unit data sample duration that is stored in the base unit 110 memory 304 (block 1552).

If both the base unit data sample duration is equal to the duration of the tag data sample duration (e.g., both are 2000 milliseconds in duration), then the base unit 110 flags each of the data sample sets as a candidate match (block 1554). By examining a data sample duration rather than one or more computationally intensive examinations of the contents of the data sample sets, the base unit 110 may make a preliminary match between collected tag data and collected base unit data. One or more subsequent detailed data sample analysis procedure(s) may occur to identify other aspects of the collected data samples (e.g., content identification, distance calculation between base unit and tag, etc.), as described above. However, the preliminary match by the base unit 110 reduces processing requirements of such subsequent detailed analysis procedure(s).

The example base unit 110 determines whether one or more additional base unit data sample sets are stored in the memory 304 and, if so, control returns to block 1552. On the other hand, if the base unit 110 memory 304 has no additional data sample sets, the example process 1518 ends.

Figure 16:
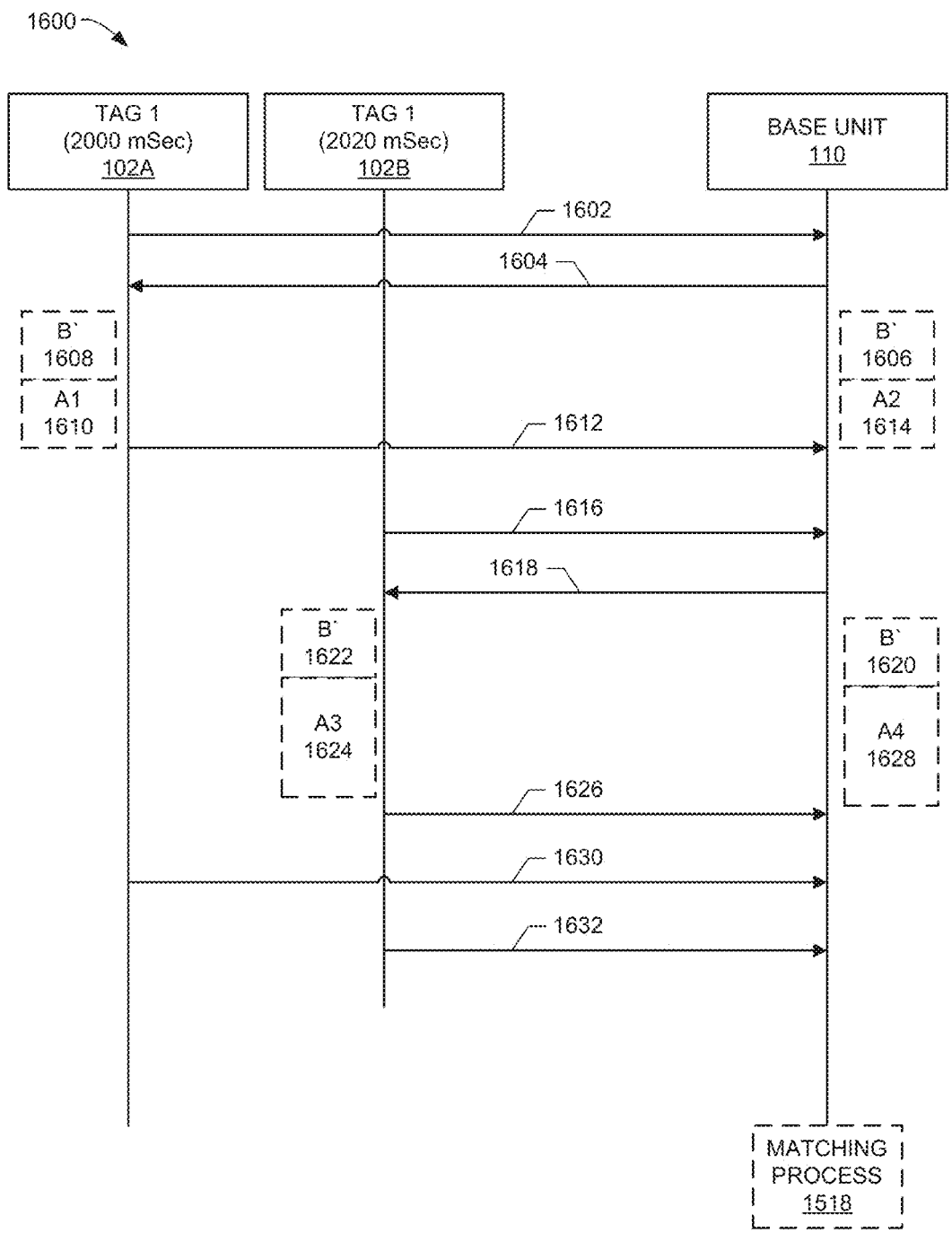
FIG. 16 is a message diagram representative of example communication between elements of the example system shown in FIGS. 1-3.

In the illustrated example of FIG. 16, a message diagram 1600 includes the first tag 102A, the second tag 102B and the base unit 110. In operation, the first tag 102A is configured to perform its action (e.g., recording audio samples and store them to memory 204 as data samples) for 2000 milliseconds. However, the second tag 102B is configured to perform its action for 2020 milliseconds. The example durations of 2000 milliseconds and 2020 milliseconds are described here for purposes of explanation and not limitation. Any other duration may be employed with the example methods, apparatus, articles of manufacture and systems described herein.

The example first tag 102A sends an RF initialization packet 1602 to the example base unit 110 to determine whether the base unit is within range of the first tag 102A. As described above, if the first tag 102A does not receive an RF ACK packet within a threshold period of time, the tag 102A assumes that it is not near any base units and waits to transmit another RF initialization packet at another time. However, in the event that the base unit 110 receives the RF initialization packet 1602, the base unit 110 responds with an RF ACK packet 1604 and begins to wait for the calibrated delay period B' (1606), as described above. Additionally, upon receipt of the RF ACK packet 1604, the example first tag 102A begins its calibrated delay period B' (1608). When the calibrated delay period B' (1606, 1608) expires, the example first tag 102A performs its action A1 for a period of 2000 milliseconds (1610). At the end of the action A1, the example first tag 102A transmits an RF stop packet 1612, which causes the example base unit 110 to also stop its action A2 (1614).

The illustrated example of FIG. 16 also includes the second tag 102B sending an RF initialization packet 1616 to the example base unit 110, and receiving an RF ACK packet 1618. The transmission of the RF ACK packet 1618 causes the example base unit 110 to begin a calibrated delay period B' (1620) and, when received by the example second tag 102B, begins the calibrated delay period B' at the second tag 102B (1622). When the calibrated delay period B' (1620, 1622) expires, the example second tag 102B performs its action A3 for a period of 2020 milliseconds (1624), which is 20 milliseconds greater than the duration of the action of the first example tag 102A. At the end of the action A3, the example second tag 102B transmits an RF stop packet 1626, which causes the example base unit 110 to also stop its action A4 (1628).

The example first tag 102A and/or the example second tag 102B may store collected audio samples as data samples for a period of time before transmitting the collected data samples via an RF transmission. In some examples, the tags 102A, 102B store data samples until a threshold amount of memory is consumed, and then transmit the data samples to a base unit to create more available memory storage space. In the illustrated example of FIG. 16, the first tag 102A transmits data samples associated with action A1 via an RF packet (1630), and the second tag 102B transmits data samples associated with action A3 via an RF packet (1632). As described above, the example matching process 1518 allows the base unit 110 to match data samples associated with A2 and A4 with corresponding data samples associated with the first tag 102A and the second tag 102B, respectively.

Figure 17:
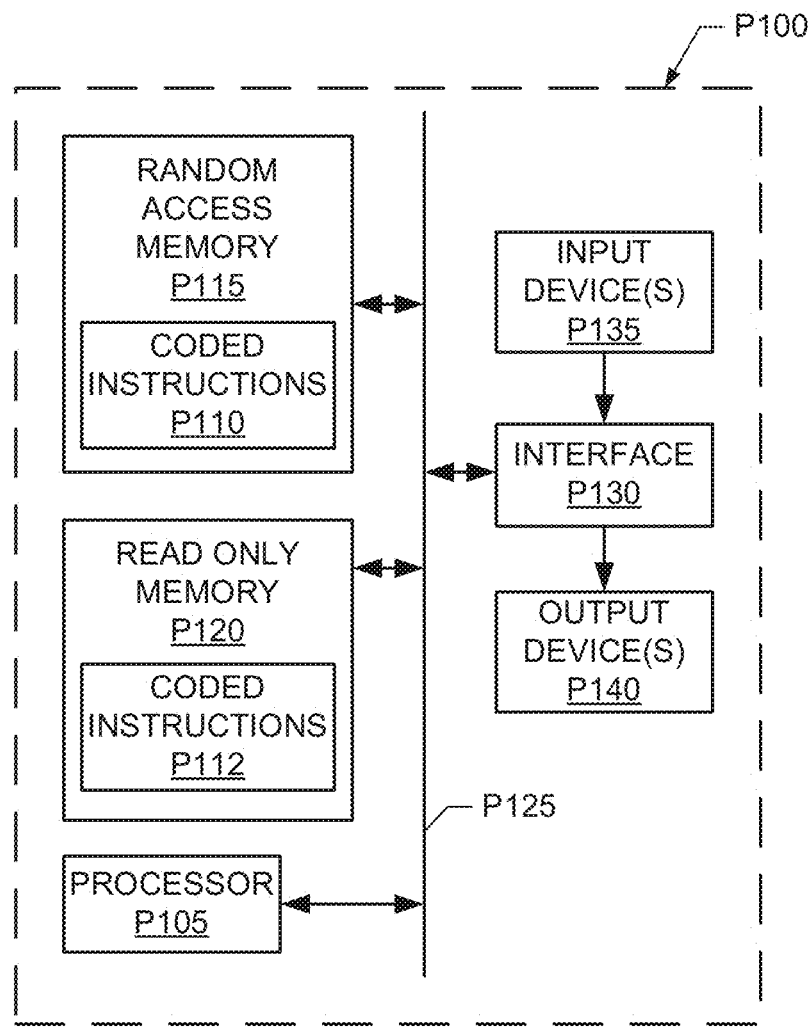
FIG. 17 is a schematic illustration of an example processor platform that may execute the instructions of FIGS. 5, 6, 7A, 9, 12, 14, 15A and 15B to implement any or all of the example methods, systems, and apparatus described herein.

FIG. 17 is a schematic diagram of an example processor platform P100 that may be used and/or programmed to implement any or all of the example tag distance calculation system 100, the example tags 102A, 102B, the example media delivery center 106, the example base unit 110, the example central facility 112, the example server 116, the example database 118, the example processor 202, the example memory 204, the example timer/counter 206, the example audio sensor 208, the example RF transmitter 210, the example processor 302, the example memory 304, the example sensors/transducers 306, the example RF interface 308, the example ultrasonic transceiver 310, the example optical sensor/transmitter 312, the example correlation engine 318, the example audio transducer 314, the example test manager 1102, the example trigger monitor 1104, the example tag interface 1106, the example base unit interface 1108 and/or the example delay period adjustor of FIGS. 1-3 and 11. For example, the processor platform P100 can be implemented by one or more general-purpose processors, processor cores, microcontrollers, etc.

The processor platform P100 of the example of FIG. 17 includes at least one general-purpose programmable processor P105. The processor P105 executes coded instructions P110 and/or P112 present in main memory of the processor P100 (for example, within a RAM P115 and/or a ROM P120). The processor P105 may be any type of processing unit, such as a processor core, a processor and/or a microcontroller. The processor P105 may execute, among other things, the example processes of FIGS. 5-7A, 9, 12, 14, 15A and 15B to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to improve audio data overlap and matching accuracy between a base unit and an audience monitor, comprising:

initiating a delay period having a first duration on the base unit and the audience monitor, the delay period initiated in response to the base unit sending an acknowledgment signal to the audience monitor, the acknowledgment signal being in response to a radio frequency (RF) initialization signal received by the base unit from the audience monitor at a first time;

determining, when the first duration expires at a second time, if the audience monitor is still processing the acknowledgement signal; and incrementing the delay period to a second duration to improve audio data overlap and matching accuracy between the base unit and the audience monitor when the audience monitor is still processing the acknowledgement signal after the first duration expires, the second duration based on an increase of the difference between the first time and the second time.

2. A method as defined in claim 1, wherein the delay period is based upon a room size.

3. A method as defined in claim 1, further including triggering a base unit measurement pulse in response to the expiration of the delay period.

4. A method as defined in claim 3, further including measuring a delay between the base unit measurement pulse and a stop signal from the audience monitor.

5. A method as defined in claim 4, wherein the stop signal from the audience monitor is indicative of the audience monitor completion of audio data processing.

6. A method as defined in claim 1, further including determining an alternate duration for the delay period by adjusting a packet length of the acknowledgement signal from the base unit.

7. A method as defined in claim 6, further including identifying an upper boundary duration of the delay period by adjusting the packet length of the acknowledgement signal to a relatively higher value.

8. An apparatus to improve audio data overlap and matching accuracy between a base unit and an audience monitor, comprising:

a test manager to initiate a delay period having a first duration on the base unit and the audience monitor, the delay period initiated in response to the base unit sending an acknowledgement signal to the audience monitor, the acknowledgement signal being in response to a radio frequency (RF) initialization signal received by the base unit from the audience monitor at a first time, the test manager to determine, when the first duration expires at a second time, if the audience monitor is still processing the acknowledgement signal; and a delay period adjuster to increment the delay period to a second duration to improve audio data overlap and matching accuracy between the base unit and the audience monitor when the audience monitor is still processing the acknowledgement signal after the first duration expires, the second duration based on an increase of the difference between the first time and the second time.

9. An apparatus as defined in claim 8, wherein the delay period adjuster is to adjust the delay period based upon a room size.

10. An apparatus as defined in claim 8, wherein the test manager is to trigger a base unit measurement pulse in response to the expiration of the delay period.

11. An apparatus as defined in claim 10, wherein the delay period adjuster is to measure a delay between the base unit measurement pulse and a stop signal from the audience monitor.

12. An apparatus as defined in claim 11, wherein the stop signal from the audience monitor is indicative of the audience monitor completion of audio data processing.

13. An apparatus as defined in claim 8, wherein the delay period adjuster is to determine an alternate duration for the delay period by adjusting a packet length of the acknowledgement signal from the base unit.

14. An apparatus as defined in claim 13, wherein the delay period adjuster is to identify an upper boundary duration of the delay period by adjusting the packet length of the acknowledgement signal to a relatively higher value.

15. An article of manufacture comprising instructions which, when executed, cause a machine to at least:

initiate a delay period having a first duration on a base unit and an audience monitor, the delay period initiated in response to the base unit sending an acknowledgement signal to the audience monitor, the acknowledgement signal being in response to a radio frequency (RF) initialization signal received by the base unit from the audience monitor at a first time;

determine, when the first duration expires at a second time, if the audience monitor is still processing the acknowledgement signal; and increment the delay period to a second duration to improve audio data overlap and matching accuracy between the base unit and the audience monitor when the audience monitor is still processing the acknowledgement signal after the first duration expires, the second duration based on an increase of the difference between the first time and the second time.

16. An article of manufacture as defined in claim 15, wherein the instructions, when executed, trigger a base unit measurement pulse in response to the expiration of the delay period.

17. An article of manufacture as defined in claim 16, wherein the instructions, when executed, measure a delay between the base unit measurement pulse and a stop signal from the audience monitor.

18. An article of manufacture as defined in claim 17, wherein the instructions, when executed, identify completion of audio data processing in response to detecting the stop signal.

19. An article of manufacture as defined in claim 15, wherein the instructions, when executed, determine an alternate duration for the delay period by adjusting a packet length of the acknowledgement signal from the base unit.

20. An article of manufacture as defined in claim 19, wherein the instructions, when executed, identify an upper boundary duration of the delay period by adjusting the packet length of the acknowledgement signal to a relatively higher value.

* * * * *